US012793723B2

(12) United States Patent
Sautiere et al.

(10) Patent No.: US 12,793,723 B2
(45) Date of Patent: Nov. 10, 2026

(54) BUNDLED MULTI-RATE FEEDBACK AUTOENCODER

(71) Applicant: QUALCOMM Incorporated, San Diego, CA (US)

(72) Inventors: Guillaume Konrad Sautiere, Amsterdam (NL); Vivek Rajendran, San Diego, CA (US); Zisis Iason Skordilis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 176 days.

(21) Appl. No.: 18/728,154

(22) PCT Filed: Jan. 23, 2023

(86) PCT No.: PCT/US2023/061086
§ 371 (c)(1),
(2) Date: Jul. 11, 2024

(87) PCT Pub. No.: WO2023/183666
PCT Pub. Date: Sep. 28, 2023

(65) Prior Publication Data

US 2025/0104723 A1 Mar. 27, 2025

(30) Foreign Application Priority Data

Mar. 21, 2022 (GR) .............................. 20220100243

(51) Int. Cl.
*G10L 19/04* (2013.01)

(52) U.S. Cl.
CPC .................................... *G10L 19/04* (2013.01)

(58) Field of Classification Search
CPC ....................................................... G10L 19/04
See application file for complete search history.

(56) References Cited

U.S. PATENT DOCUMENTS

2021/0089863 A1* 3/2021 Yang ........................ G06F 3/162
2021/0258363 A1* 8/2021 Ragot ..................... H04L 69/24
(Continued)

OTHER PUBLICATIONS

Denton T., et al., "Handling Background Noise in Neural Speech Generation", 2020 54th Asilomar Conference on Signals, Systems, and Computers, Nov. 1, 2020, XP033921422, pp. 667-671, abstract pp. 1-2.

(Continued)

*Primary Examiner* — Richemond Dorvil
*Assistant Examiner* — Ethan Daniel Kim
(74) *Attorney, Agent, or Firm* — QUALCOMM Incorporated; Espartaco Diaz Hidalgo

(57) ABSTRACT

A method includes generating an input data state for each data sample in a time series of data samples of a portion of an audio data stream. The method also includes providing at least one input data state to a first bottleneck and at least one other input data state to a second bottleneck. The first bottleneck is associated with a first bitrate and the second bottleneck is associated with a second bitrate. The method further includes generating a first encoded frame based on a first output data state from the first bottleneck and a second encoded frame based on a second output data state from the second bottleneck. The first encoded frame and the second encoded frame are bundled in a packet.

30 Claims, 11 Drawing Sheets

(56) References Cited

U.S. PATENT DOCUMENTS

2021/0366497 A1* 11/2021 Lim ...................... G10L 19/032
2022/0030308 A1* 1/2022 Bentaleb ................. H04L 47/24

OTHER PUBLICATIONS

International Search Report and Written Opinion—PCT/US2023/061086—ISA/EPO—May 8, 2023.
Kleijn W.B., et al., "Generative Speech Coding with Predictive Variance Regularization", 2021 IEEE International Conference on Acoustics, Speech and Signal Processing (ICASSP), Jun. 6, 2021, XP033955345, pp. 6478-6482, abstract, figure 1 pp. 1, 2, 5.
Zeghidour N., et al., "SoundStream: An End-to-End Neural Audio Codec", arXiv:2107.03312v1 [cs.SD], arxiv.org, Cornell University Library, 201 Olin Library Cornell University Ithaca, NY 14853, Jul. 7, 2021, pp. 1-12, XP091009160, Abstract, Figures 1-3 pp. 1,2 pp. 5-7, Figure 3, Algorithm 1, Section III A, B, C.

* cited by examiner

BUNDLED MULTI-RATE FEEDBACK AUTOENCODER

I. CROSS-REFERENCE TO RELATED APPLICATIONS

The present application claims the benefit of priority from the commonly owned Greece Provisional Patent Application No. 20220100243, filed Mar. 21, 2022, the contents of which are expressly incorporated herein by reference in their entirety.

II. FIELD

The present disclosure is generally related to encoding and/or decoding data.

III. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice packets, data packets, or both, over wired or wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

One common use of such wireless devices is communications (e.g., voice, video, and/or data communications). In wireless communications, a device that has data to send generates a signal that represents the data as a set of bits. Often, the signal also includes other information, such as packet headers. Because wireless devices are often power constrained (e.g., battery powered) and because wireless communications resources (e.g., radiofrequency channels) can be crowded, it may be desirable to send particular data using as few bits as possible. However, many techniques for representing data using fewer bits are lossy. That is, encoding the data to be transmitted using fewer bits leads to a less faithful representation of the data. Thus, there may be tension between a goal of sending a higher fidelity representation of the data to be transmitted (e.g., using more bits) and sending data efficiently (e.g., using fewer bit).

IV. SUMMARY

According to a particular aspect, a device includes a memory and one or more processors coupled to the memory. The one or more processors are operably configured to generate a first input data state for data samples in a time series of data samples of a portion of an audio data stream. The one or more processors are also operably configured to provide the first input data state to a first bottleneck and a second input data state, different from the first input data state, to a second bottleneck. The first bottleneck is associated with a first bitrate and the second bottleneck is associated with a second bitrate. According to one implementation, the first bottleneck and the second bottleneck can correspond to a common bottleneck that is operable to dynamically change a bitrate from the first bitrate to the second bitrate. The one or more processors are further operably configured to generate a first encoded frame based on a first output data state from the first bottleneck and a second encoded frame based on a second output data state from the second bottleneck. The first encoded frame and the second encoded frame are bundled in a packet.

According to another particular aspect, a method includes generating a first input data state for data samples in a time series of data samples of a portion of an audio data stream. The method also includes providing the first input data state to a first bottleneck and a second input data state, different from the first input data state, to a second bottleneck. The first bottleneck is associated with a first bitrate and the second bottleneck is associated with a second bitrate. According to one implementation, the first bottleneck and the second bottleneck can correspond to a common bottleneck that is operable to dynamically change a bitrate from the first bitrate to the second bitrate. The method further includes generating a first encoded frame based on a first output data state from the first bottleneck and a second encoded frame based on a second output data state from the second bottleneck. The first encoded frame and the second encoded frame are bundled in a packet.

According to another particular aspect, an apparatus includes means for generating a first input data state for data samples in a time series of data samples of a portion of an audio data stream. The apparatus also includes means for providing the first input data state to a first bottleneck and a second input data state, different from the first input data state, to a second bottleneck. The first bottleneck is associated with a first bitrate and the second bottleneck is associated with a second bitrate. According to one implementation, the first bottleneck and the second bottleneck can correspond to a common bottleneck that is operable to dynamically change a bitrate from the first bitrate to the second bitrate. The apparatus further includes means for generating a first encoded frame based on a first output data state from the first bottleneck and a second encoded frame based on a second output data state from the second bottleneck. The first encoded frame and the second encoded frame are bundled in a packet.

According to another particular aspect, a non-transitory computer-readable medium stores instructions executable by one or more processors to generate a first input data state for data samples in a time series of data samples of a portion of an audio data stream. Execution of the instructions also causes the one or more processors to provide the first input data state to a first bottleneck and a second input data state, different from the first input data state, to a second bottleneck. The first bottleneck is associated with a first bitrate and the second bottleneck is associated with a second bitrate. According to one implementation, the first bottleneck and the second bottleneck can correspond to a common bottleneck that is operable to dynamically change a bitrate from the first bitrate to the second bitrate. Execution of the instructions further causes the one or more processors to generate a first encoded frame based on a first output data state from the first bottleneck and a second encoded frame based on a second output data state from the second bottleneck. The first encoded frame and the second encoded frame are bundled in a packet.

According to another particular aspect, a device includes a memory and one or more processors coupled to the memory. The one or more processors are operably configured to receive, at a decoder network, a packet that includes a first encoded frame bundled with a second encoded frame. The first encoded frame includes a first output data state generated from a first bottleneck of a feedback autoencoder, and the second encoded frame includes a second output data state generated from a second bottleneck of the feedback autoencoder. The first bottleneck is associated with a first bitrate, and the second bottleneck is associated with a second bitrate. According to one implementation, the first bottleneck and the second bottleneck can correspond to a common bottleneck that is operable to dynamically change a bitrate from the first bitrate to the second bitrate. The one or more processors are also operably configured to generate a reconstructed first data sample based on the first output data state. The reconstructed first data sample corresponds to a first data sample in a time series of data samples of a portion of an audio data stream. The one or more processors are further operably configured to generate a reconstructed second data sample based on the second output data state. The reconstructed second data sample corresponds to a second data sample in the time series of data samples.

According to another particular aspect, a method includes receiving, at a decoder network, a packet that includes a first encoded frame bundled with a second encoded frame. The first encoded frame includes a first output data state generated from a first bottleneck of a feedback autoencoder, and the second encoded frame includes a second output data state generated from a second bottleneck of the feedback autoencoder. The first bottleneck is associated with a first bitrate, and the second bottleneck is associated with a second bitrate. According to one implementation, the first bottleneck and the second bottleneck can correspond to a common bottleneck that is operable to dynamically change a bitrate from the first bitrate to the second bitrate. The method also includes generating a reconstructed first data sample based on the first output data state. The reconstructed first data sample corresponds to a first data sample in a time series of data samples of a portion of an audio data stream. The method further includes generating a reconstructed second data sample based on the second output data state. The reconstructed second data sample corresponds to a second data sample in the time series of data samples.

According to another particular aspect, an apparatus includes means for receiving a packet that includes a first encoded frame bundled with a second encoded frame. The first encoded frame includes a first output data state generated from a first bottleneck of a feedback autoencoder, and the second encoded frame includes a second output data state generated from a second bottleneck of the feedback autoencoder. The first bottleneck is associated with a first bitrate, and the second bottleneck is associated with a second bitrate. According to one implementation, the first bottleneck and the second bottleneck can correspond to a common bottleneck that is operable to dynamically change a bitrate from the first bitrate to the second bitrate. The apparatus also includes means for generating a reconstructed first data sample based on the first output data state. The reconstructed first data sample corresponds to a first data sample in a time series of data samples of a portion of an audio data stream. The apparatus further includes means for generating a reconstructed second data sample based on the second output data state. The reconstructed second data sample corresponds to a second data sample in the time series of data samples.

According to another particular aspect, a non-transitory computer-readable medium stores instructions executable by one or more processors to receive, at a decoder network, a packet that includes a first encoded frame bundled with a second encoded frame. The first encoded frame includes a first output data state generated from a first bottleneck of a feedback autoencoder, and the second encoded frame includes a second output data state generated from a second bottleneck of the feedback autoencoder. The first bottleneck is associated with a first bitrate, and the second bottleneck is associated with a second bitrate. According to one implementation, the first bottleneck and the second bottleneck can correspond to a common bottleneck that is operable to dynamically change a bitrate from the first bitrate to the second bitrate. Execution of the instructions also causes the one or more processors to generate a reconstructed first data sample based on the first output data state. The reconstructed first data sample corresponds to a first data sample in a time series of data samples of a portion of an audio data stream. Execution of the instructions further causes the one or more processors to generate a reconstructed second data sample based on the second output data state. The reconstructed second data sample corresponds to a second data sample in the time series of data samples.

V. BRIEF DESCRIPTION OF THE DRAWINGS

VI. DETAILED DESCRIPTION

Figure 1:
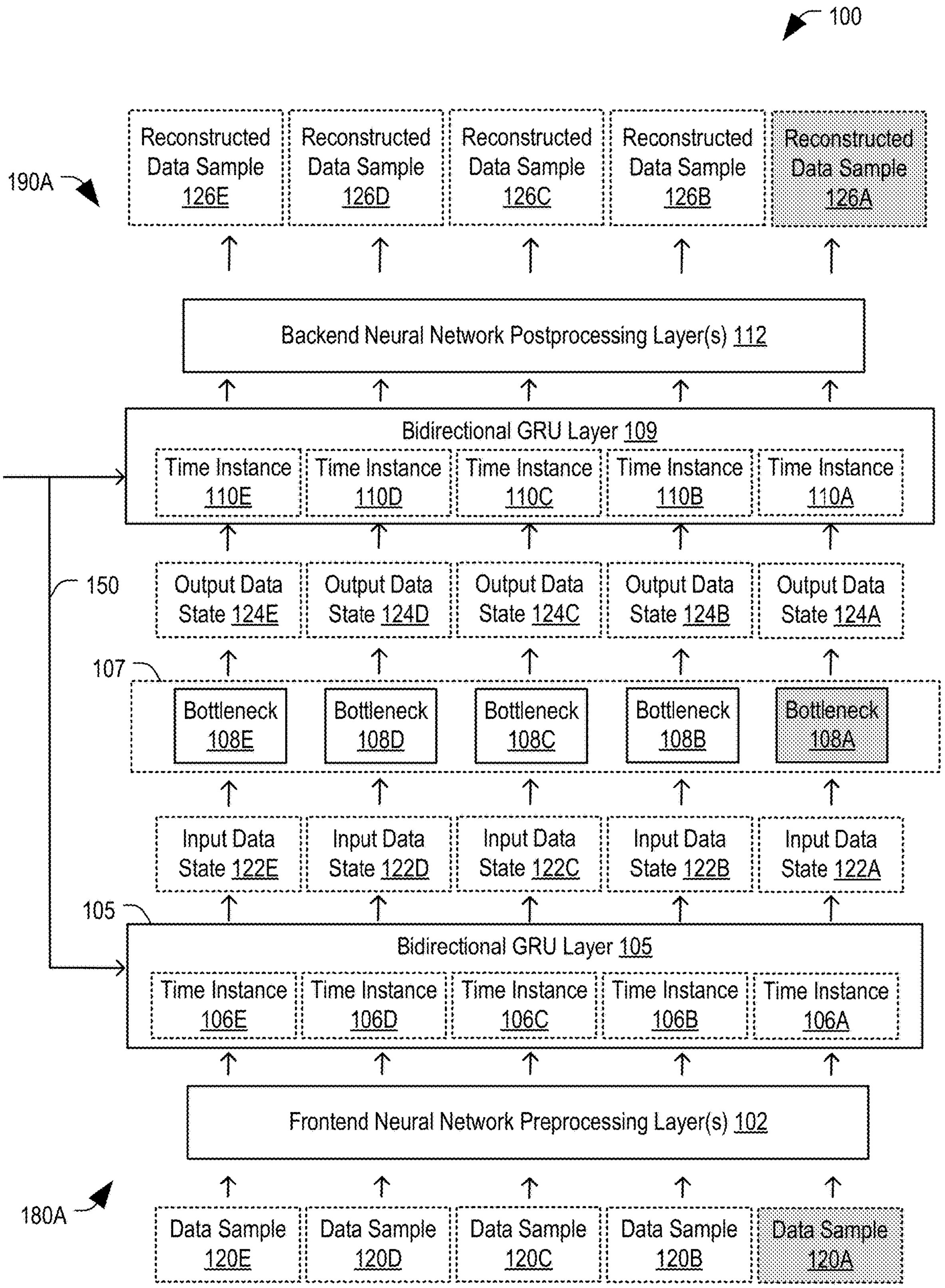
FIG. 1 is a diagram of a particular illustrative example of a system that is configured to encode data using multiple bitrates for different frames in a packet and jointly coding them using a bidirectional gated recurrent unit.

An encoder can be used to encode data samples into frames that are transmitted to a receiving device. In some scenarios, usage of an encoder can be inefficient because frames are not bundled in a packet. For example, a separate packet (including a large header section) can be used to send each encoded frame to the receiving device. Using a separate packet for each frame results in multiple bits being allocated to headers as opposed to data portions of the frame, which is inefficient. In other scenarios where, frames encoded using a FRAE are bundled into a packet, the FRAE typically uses the same number of bits to encode each frame in a packet. Using the same number of bits to encode each frame in the packet can also result in allocation of a relatively large amount of bits, which is inefficient and can result in an increased transmission bandwidth.

Aspects disclosed herein enable a bundled multi-rate feedback autoencoder to encode frames that are bundled into a packet while selectively allocating a different number of bits to the frames. For example, the aspects disclosed herein exploit redundancy data in frames bundled into a packet by allocating a relatively large amount of bits to a reference frame and allocating a smaller amount of bits to other frames in the packet (e.g., "predicted frames") that can be reconstructed using data from the reference frame. To allocate a different number of bits to different frames and encode the frames at a similar frequency to facilitate packetizing the frames, data associated with the reference frames can be encoded at a different bitrate than data associated with the predicted frames. For example, the bundled multi-rate feedback autoencoder can include a multi-rate bottleneck layer that encodes data at different bitrates. To illustrate, a first bottleneck layer can encode data for a first frame at a first bitrate and a second bottleneck layer can encode data for a second frame at a second bitrate that is greater than the first bitrate. By encoding data for the second frame at a higher bitrate, a greater number of bits can be allocated to the second frame while encoding each frame at a similar frequency (e.g., a packet frequency). Thus, the techniques described herein enable frames encoded using a bundled multi-rate feedback autoencoder to be bundled into a packet, which improves header efficiency. Additionally, the techniques described herein enable a different amount of bits to be allocated to frames within the packet, which improves transmission bandwidth.

Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, smoothing, and/or selecting from a plurality of values. Unless expressly limited by its context, the term "obtaining" is used to indicate any of its ordinary meanings, such as calculating, deriving, receiving (e.g., from another component, block, or device), and/or retrieving (e.g., from a memory register or an array of storage elements).

Unless expressly limited by its context, the term "producing" is used to indicate any of its ordinary meanings, such as calculating, generating, and/or providing. Unless expressly limited by its context, the term "providing" is used to indicate any of its ordinary meanings, such as calculating, generating, and/or producing. Unless expressly limited by its context, the term "coupled" is used to indicate a direct or indirect electrical or physical connection. If the connection is indirect, there may be other blocks or components between the structures being "coupled." For example, a loudspeaker may be acoustically coupled to a nearby wall via an intervening medium (e.g., air) that enables propagation of waves (e.g., sound) from the loudspeaker to the wall (or vice-versa).

The term "configuration" may be used in reference to a method, apparatus, device, system, or any combination thereof, as indicated by its particular context. Where the term "comprising" is used in the present description and claims, it does not exclude other elements or operations. The term "based on" (as in "A is based on B") is used to indicate any of its ordinary meanings, including the cases (i) "based on at least" (e.g., "A is based on at least B") and, if appropriate in the particular context, (ii) "equal to" (e.g., "A is equal to B"). In the case (i) where A is based on B includes based on at least, this may include the configuration where A is coupled to B. Similarly, the term "in response to" is used to indicate any of its ordinary meanings, including "in response to at least." The term "at least one" is used to indicate any of its ordinary meanings, including "one or more". The term "at least two" is used to indicate any of its ordinary meanings, including "two or more".

The terms "apparatus" and "device" are used generically and interchangeably unless otherwise indicated by the particular context. Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The terms "method," "process," "procedure," and "technique" are used generically and interchangeably unless otherwise indicated by the particular context. The terms "element" and "module" may be used to indicate a portion of a greater configuration. The term "packet" may correspond to a unit of data that includes a header portion and a payload portion. Any incorporation by reference of a portion of a document shall also be understood to incorporate definitions of terms or variables that are referenced within the portion, where such definitions appear elsewhere in the document, as well as any figures referenced in the incorporated portion.

As used herein, the term "communication device" refers to an electronic device that may be used for voice and/or data communication over a wireless communication network. Examples of communication devices include speaker bars, smart speakers, cellular phones, personal digital assistants (PDAs), handheld devices, headsets, wireless modems, laptop computers, personal computers, etc.

Particular aspects are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple data samples are illustrated and associated with reference numbers 120A, 120B, 120C, etc. When referring to a particular one of these data samples, such as the data sample 120A, the distinguishing letter "A" is used. However, when referring to any arbitrary one of these data samples or to these data samples as a group, the reference number 120 is used without a distinguishing letter.

FIG. 1 is a diagram of a particular illustrative example of a system 100 that is configured to encode data using multiple bitrates for different frames in a packet and jointly coding them using a bidirectional gated recurrent unit. For example, the system 100 can employ neural network architectures along with bottlenecks operating at different bitrates to generate output data states 124 representative of encoded data samples. The encoded data samples can be transmitted to a receiving device, such as a receiving device 652 of FIG. 6, as frames bundled into a packet, and the receiving device can subsequently decode the frames for playout. Thus, the system 100 can be integrated into a transmitting device, such as a transmitting device 602 of FIG. 6, that is configured to send one or more encoded data packets to the receiving device.

According to one implementation, the system 100 corresponds to a bundled multi-rate feedback autoencoder architecture. The system 100 includes an encoder portion 180A and a decoder portion 190A that provides feedback to the encoder portion 180A. The encoder portion 180A of the system 100 includes one or more frontend neural network preprocessing layers 102, a bidirectional gated recurrent unit (GRU) layer 105, and a bottleneck layer 107.

The bidirectional GRU layer 105 includes a bidirectional GRU network that is implemented over time instances 106A-106E. For example, the bidirectional GRU layer 105 includes a bidirectional GRU network that is implemented over a time instance 106A, a time instance 106B, a time instance 106C, a time instance 106D, and a time instance 106E. Although the bidirectional GRU network of the bidirectional GRU layer 105 is illustrated as being implemented at five time instances 106A-106E, in other implementations, the bidirectional GRU network of the bidirectional GRU layer 105 can be implemented at fewer time instances 106 or at more time instances 106. As a non-limiting example, the bidirectional GRU network of the bidirectional GRU layer 105 can be implemented at four (4) time instances 106. As another non-limiting example, the bidirectional GRU network of the bidirectional GRU layer 105 can be implemented at six (6) time instances 106.

According to some implementation, the frontend neural network preprocessing layer(s) 102 can include frontend GRUs, as opposed to fully connected layers, and the number of outputs of the frontend neural network preprocessing layer(s) 102 can differ from the number of data samples 120 provided to the frontend neural network preprocessing layer(s) 102. For example, the frontend neural network preprocessing layer(s) 102 can summarize the inputs (e.g., the data samples 120) or up-sample the inputs based on the number of times the frontend GRUs (within the frontend neural network preprocessing layer(s) 102) are tapped. In these scenarios, there may not be a one-to-one correspondence between the data samples 120A-120E and the time instances 106A-106E.

The bottleneck layer 107 includes a plurality of bottlenecks 108A-108E. For example, the bottleneck layer 107 includes a bottleneck 108A, a bottleneck 108B, a bottleneck 108C, a bottleneck 108D, and a bottleneck 108E. Although five bottlenecks 108 are illustrated, in other implementations, the bottleneck layer 107 can include fewer (or additional) bottlenecks 108. As a non-limiting example, the bottleneck layer 107 can include four (4) bottlenecks 108. As another non-limiting example, the bottleneck layer 107 can include six (6) bottlenecks 108. The architecture for the bottlenecks 108 is described in greater detail with respect to FIG. 3.

The decoder portion 190A of the system 100 includes a bidirectional GRU layer 109 and one or more backend neural network postprocessing layers 112. The bidirectional GRU layer 109 includes a bidirectional GRU network that is implemented over time instances 110A-110E. For example, the bidirectional GRU layer 109 includes a bidirectional GRU network that is implemented over a time instance 110A, a time instance 110B, a time instance 110C, a time instance 110D, and a time instance 110E. Although the bidirectional GRU network of the bidirectional GRU layer 109 is illustrated as being implemented at five time instances 110A-110E, in other implementations, the bidirectional GRU network of the bidirectional GRU layer 109 can be implemented at fewer time instances 110 or at more time instances 110. As a non-limiting example, the bidirectional GRU network of the bidirectional GRU layer 109 can be implemented at four (4) time instances 110. As another non-limiting example, the bidirectional GRU network of the bidirectional GRU layer 109 can be implemented at six (6) time instances 110. According to some implementations, the backend neural network postprocessing layer(s) 112 can include backend GRUs, as opposed to fully connected layers, and the number of outputs of the backend neural network postprocessing layer(s) 112 can differ from the inputs provided to the backend neural network postprocessing layer(s) 112. In these scenarios, there may not be a one-to-one correspondence between the reconstructed data samples 126A-126E and the time instances 110A-110E.

A data stream that includes data arranged in a time series can be provided to the encoder portion 180A of the system 100. For example, the data stream can include a time series of data samples 120, where each data sample 120 represents a time-windowed portion of data. Although described as "data samples," in other implementations, each data sample 120 can correspond to a "frame" of the data stream. As illustrated in FIG. 1, the data samples 120 includes a data sample 120A, a data sample 120B, a data sample 120C, a data sample 120D, and a data sample 120E. The data sample 120A includes data (e.g., extracted features) generated at an earlier time instance than data included in the data sample 120B, the data sample 120B includes data generated at an earlier time instance than data included in the data sample 120C, etc. According to some implementations, adjacent data samples 120 can include overlapping data (e.g., temporal redundancies). For example, a portion of the data in the data sample 120A can also be included in the data sample 120B. In some examples, the data included in the data samples 120 includes media data, such as voice data, audio data, video data, game data, augmented reality data, other media data, or combinations thereof. As explained below and further illustrated in FIG. 4, each data sample 120A-120E can be encoded into a corresponding frame, such as frames 420A-420E, and packetized for transmission to a receiving device.

To reduce the amount of bits that are used to encode the data samples 120, the system 100 can select a data sample (e.g., a reference frame data sample) that is to be encoded into a reference frame (e.g., the frame 420A) and can select data samples (e.g., predicted frame data samples) that are to be encoded into predicted frames (e.g., the frames 420B-420E). For ease of illustration and description, reference frames and data samples associated with reference frames are shaded in gray. The above-described temporal redundancies are exploited during encoding and decoding of the data samples 120 by using the reference frame to predict the other frames.

To illustrate, the system 100 can designate M bits to encode the reference frame data sample and can designate N bits to encode each of the predicted frame data samples, where M is significantly greater than N (e.g., $M \gg N$). For illustrative purposes, the data sample 120A is designated as the reference frame data sample, indicated by the gray shading, and the data samples 120B-120E are designated as the predicted frame data samples. Thus, in the example of FIG. 1, the total number of bits to encode the data samples 120A-120E is equal to $4 \times N + M$. Because M is significantly greater than N, the total number of bits to encode the data samples 120A-120E is significantly less than encoding each data sample 120A-120E as a reference frame data sample (e.g., $4\times N+M \ll 5\times M$). Thus, the total number of bits to encode the data samples 120A-120E using the system 100 is significantly less than the $5\times M$ bits that would be used by a traditional feedback recurrent autoencoder (FRAE) architecture.

Figure 4:
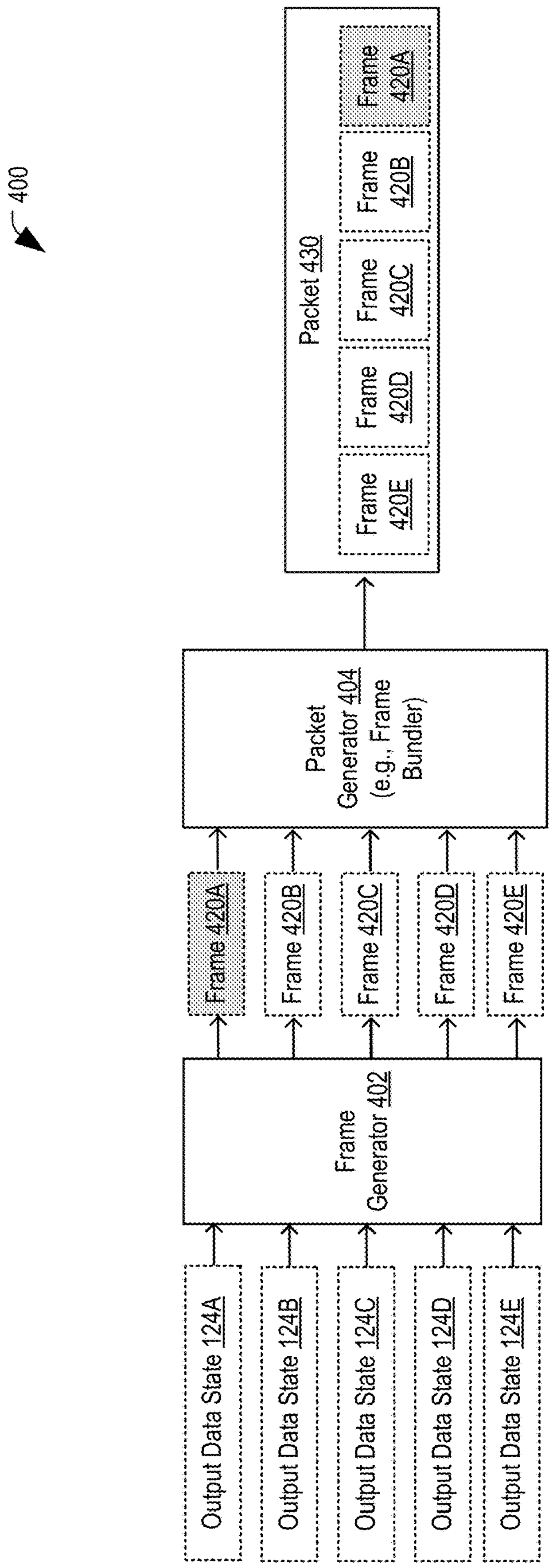
FIG. 4 is a diagram of a particular illustrative example of a system that is operable to bundle frames generated at different bitrates into a packet.

However, to account for the increased number of bits used to encode the reference frame data sample 120A, the reference frame data sample 120A has to be encoded at an increased bitrate (compared to the bitrate of the predicted frame data samples 120B-120E) if each of the data samples 120A-120E are to be encoded at the same frequency (e.g., a packet frequency). Thus, as described below, the bottleneck 108A associated with the reference frame data sample 120A can operate at a higher bitrate than the bottlenecks 108B-108E associated with the predicted frame data samples 120B-120E such that each data sample 120 is encoded into a frame at the same frequency (e.g., the packet frequency) as to facilitate bundling the corresponding frames 420A-420E into a packet 430, as illustrated in FIG. 4. It should be understood that the designation in FIG. 1 is merely for illustrative purposes and different designations can be used. As a non-limiting example, two or more data samples can be designated as reference frame data samples or a different data sample can be designated as a reference frame data sample.

The data samples 120A-120E are provided to the one or more frontend neural network preprocessing layers 102. In some implementations, the one or more frontend neural network preprocessing layers 102 include one or more fully connected layers. As described herein, a "fully connected layer" is a feed-forward neural network that includes multiple input nodes and generates one or more outputs based on weighting and mapping functions. According to some implementations, a fully connected layer can include multiple node levels (e.g., input level nodes, intermediate level nodes, and output level nodes) that have unique weighting and mapping patterns. For ease of explanation, the fully connected layers are described as receiving one or more inputs and generating one or more outputs based on neural network operations. However, it should be understood that the architecture of each fully connected layer described herein can be unique and can have unique weighting and mapping patterns as to generate simple or complex neural networks. The one or more frontend neural network preprocessing layers 102 can receive the data samples 120A-120E and generate corresponding neural network encoded data that is provided to the bidirectional GRU layer 105.

The bidirectional GRU layer 105 is configured to generate an input data state 122A-122E at each time instance 106A-106E, respectively. The input data states 122A-122E are provided to corresponding bottlenecks 108A-108E of the bottleneck layer 107. As a non-limiting example, the bidirectional GRU layer 105 is configured to generate an input data state 122A associated with the data sample 120A at the time instance 106A, the bidirectional GRU layer 105 is configured to generate an input data state 122B associated with the data sample 120B at the time instance 106B, the bidirectional GRU layer 105 is configured to generate an input data state 122C associated with the data sample 120C at the time instance 106C, the bidirectional GRU layer 105 is configured to generate an input data state 122D associated with the data sample 120D at the time instance 106D, and the bidirectional GRU layer 105 is configured to generate an input data state 122E associated with the data sample 120E at the time instance 106E.

The bidirectional GRU layer 105 can also generate the respective input data states 122A-122E based on data associated with previous time steps and future time steps. For example, each bidirectional GRU layer 105 can access input data states 122 from neighboring time instances 106 to generate the respective input data state 122A-122E. Thus, the bidirectional GRU layer 105 can generate the input data states in a manner that accounts for data states associated with the other data samples 120.

Additionally, the input data states 122A-122E can be generated based on feedback 150 (e.g., an output data state 124) from previously decoded data samples. To illustrate, the decoder portion 190A of the system 100 can provide feedback 150 to the bidirectional GRU layer 105. The feedback 150 can include data states (e.g., output data states) of previously decoded packets. As a result, the bidirectional GRU layer 105 can encode data associated with the data samples 120A-120E (e.g., the outputs of the one or more frontend neural network preprocessing layers 102) in a manner that accounts for previously encoded/decoded data samples. Although not illustrated in FIG. 1, the previously decoded frames can correspond to a decoded frame in the packet 634 of FIG. 6 (e.g., a packet generated prior to the packet 430 associated with the encoded data samples 120).

In FIG. 1, the input data states 122A-122E can correspond to encoder hidden states generated by the bidirectional GRU layer 105. According to the example of FIG. 1, the input data state 122A is provided to the bottleneck 108A, the input data state 122B is provided to the bottleneck 108B, the input data state 122C is provided to the bottleneck 108C, the input data state 122D is provided to the bottleneck 108D, and the input data state 122E is provided to the bottleneck 108E.

The bottlenecks 108B-108E are associated with a first bitrate and the bottleneck 108A is associated with a second bitrate that is greater than the first bitrate. That is, because more bits are used to encode the data sample 120A into a reference frame (e.g., the frame 420A) than to encode the data samples 120B-120E into predicted data frames (e.g., the frames 420B-420E), the bitrate of the bottleneck 108A associated with the data sample 120A is higher than the bitrate of the bottlenecks 108B-108E associated with the other data samples 120B-120E. Although illustrated as four separate bottlenecks, the bottlenecks 108B-108E can be a single bottleneck that encode the input data states 122B-122E at different times instances. According to one implementation, to reduce the bitrate of the bottlenecks 108B-108E compared to the bitrate of the bottleneck 108A, a smaller number of bit (e.g., units) are allocated to latent codes generated at the bottlenecks 108B-108E compared to the number of bits (e.g., units) allocated to latent codes generated at the bottleneck 108A, as further described with respect to FIG. 3. Additionally, or in the alternative, to reduce the bitrate of the bottlenecks 108B-108E compared to the bitrate of the bottleneck 108A, codebooks associated with the bottlenecks 108B-108E can have a smaller size (or allocate a smaller number of bits) than a codebook associated with the bottleneck 108A, as further described with respect to FIG. 3.

The bottleneck 108A is configured to generate an output data state 124A based on the input data state 122A. According to one implementation and as further described with respect to FIG. 3, the output data state 124A can correspond to a latent code (e.g., a post-quantization latent code) generated, using a codebook, based on the input data state 122A. In a similar manner, the bottleneck 108B is configured to generate an output data state 124B based on the input data state 122B, the bottleneck 108C is configured to generate an output data state 124C based on the input data state 122C, the bottleneck 108D is configured to generate an output data state 124D based on the input data state 122D, and the bottleneck 108E is configured to generate an output data state 124E based on the input data state 122E. Generation of the output data states 124 is described in greater detail with respect to FIG. 3. As explained in greater detail with respect to FIG. 4, the output data states 124A-124E can be included in corresponding encoded data frames 420A-420E that are bundled into a packet 430 and transmitted to a receiving device.

The decoder portion 190A of the system 100 is configured to reconstruct the data samples 120A-120E based on the output data states 124A-124E. To illustrate, the output data states 124 are provided to the bidirectional GRU layer 109. The bidirectional GRU layer 109 can use the feedback 150 (e.g., an output data state from a previous packet) to initialize the bidirectional GRU layer 109. Based on the feedback 150, the bidirectional GRU layer 109 can perform decoding operations on the output data states 124 to generate outputs that are provided to the one or more backend neural network postprocessing layers 112. Operation of the bidirectional GRU layer 109 is described in greater detail with respect to FIG. 5. The one or more backend neural network postprocessing layers 112 are configured to reconstruct the data samples 120D-120A to generate reconstructed data samples 126D-126A, respectively.

It should be appreciated that the system 100 of FIG. 1 enables a temporal structure of the data samples 120 to be preserved during encoding. For example, instead of concatenating features of the data samples 120 to generate a single input data state that eliminates the temporal structure, the bidirectional GRU layer 105 generates input data states 122A-122E for each data sample 120A-120E such that the temporal structure is preserved. Thus, the system 100 reduces the complexity of reconstructing frames by reserving the temporal structure in code that may otherwise be lost (or implicitly learned). Preservation of the temporal structure results in improved and more efficient data sample reconstruction at the decoder portion 190A of the system 100 (or at a decoder of a receiving device). Additionally, use of the bidirectional GRU layer 105, as opposed to a conventional GRU layer, enables temporal redundancies to be exploited during encoding. For example, as described above, the bidirectional GRU layer 105 can access data states from previous and future time steps to exploit temporal redundancies in generation of the input data states 122A-122E.

The system 100 further enables customized bit allocation for the encoding of different data samples 120. For example, a greater number of bits is allocated to a reference frame data sample (e.g., the data sample 120A) than to the predicted frame data samples (e.g., the data samples 120B-120E). Thus, if the data samples 120A-120E are encoded into five respective frames (e.g., the frames 420A-420E of FIG. 4) that are bundled into a packet (e.g., the packet 430 of FIG. 4), a boundary frame (e.g., the frame 420A associated with the data sample 120A) of the packet 430 can be encoded with additional bits to be used as a reference frame. As a result, the remaining frames 420B-420E can be encoded with a relatively small amount of bits, which in turn, reduces the amount of bits used to encode bundled frames in the packet 430. It should be appreciated that the system 100 has flexibility to allocate additional bits to any data sample 120 and to increase the bitrate of the corresponding bottleneck 108 to encode the data sample 120 at the packet frequency. In some scenarios, the system 100 can allocate zero bits to a particular data sample 120 for encoding. In these scenarios, nothing would be transmitted for the particular data sample 120 and a decoder would predict a corresponding frame based on encoded data in neighboring frames.

According to some implementations, system complexity is reduced by sharing the frontend neural network preprocessing layers 102 and the backend neural network postprocessing layers 112 across time steps. For example, the frontend neural network preprocessing layers 102 and the backend neural network postprocessing layers 112 can perform pre-processing operations and post-processing operations in parallel. As a result, the system 100 can experience lower memory usage and reduced complexity. Additionally, by sharing the frontend neural network preprocessing layers 102 and the backend neural network postprocessing layers 112 across time steps, the system 100 can adapt to network conditions on the fly by changing the bitrate with reduced weight loading. For example, the bitrate of the bottlenecks 108 can be changed in response to a change in network conditions, but the frontend neural network preprocessing layers 102, the bidirectional GRU layer 105, and the backend neural network postprocessing layers 112 can remain unchanged.

Figure 2:
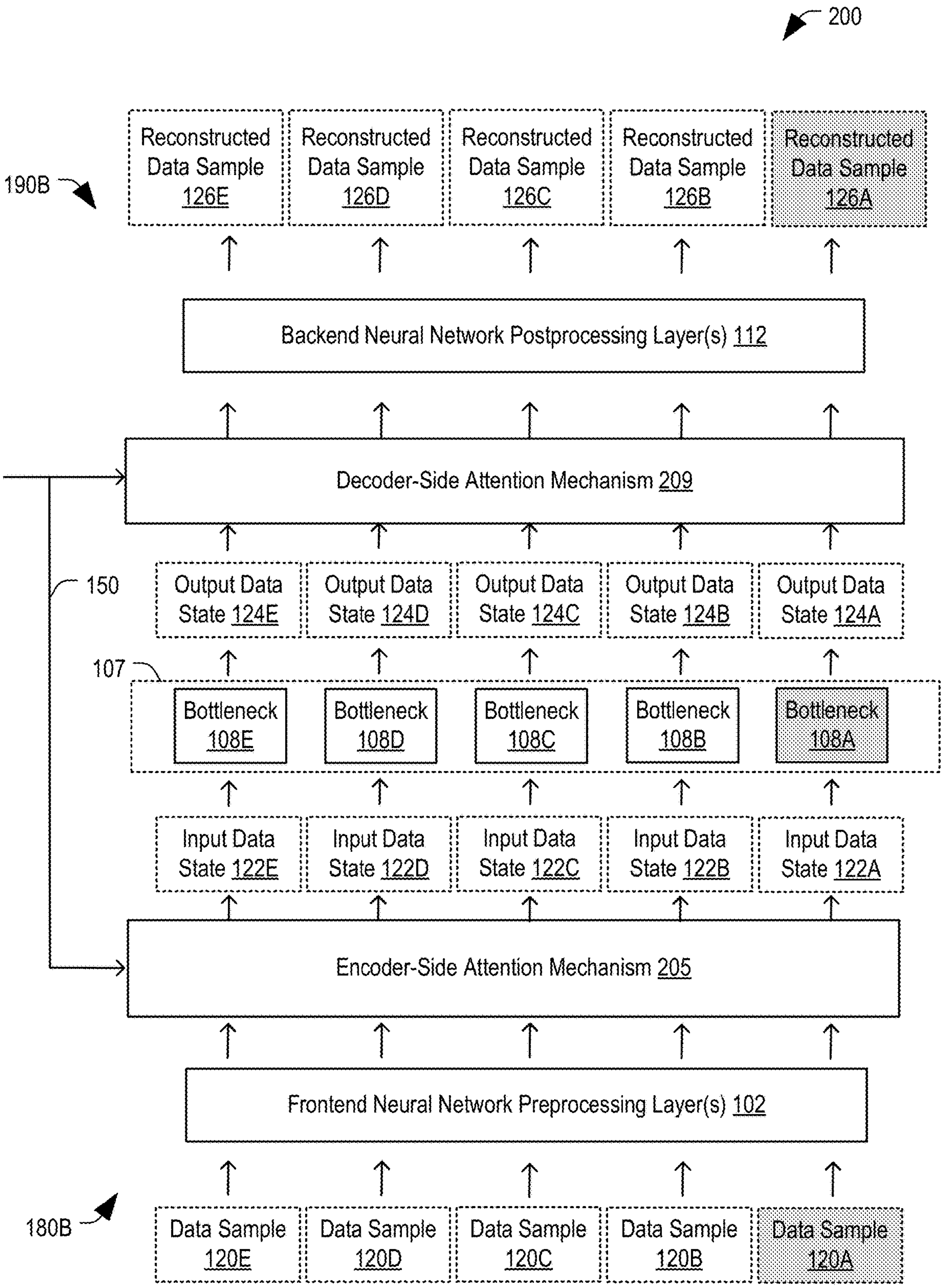
FIG. 2 is a diagram of another particular illustrative example of a system that is configured to encode data using multiple bitrates for different frames in a packet and jointly coding them using a transformer-like attention mechanism.

FIG. 2 is a diagram of another particular illustrative example of a system 200 that is configured to encode data using multiple bitrates for different frames in a packet and jointly coding them using a transformer-like attention mechanism. Similar to the system 100 of FIG. 1, the system 200 can employ neural network architectures to generate the output data states 124 representative of encoded audio data samples.

The system 200 of FIG. 2 has a substantially similar architecture as the system 100 of FIG. 1 and operates in a substantially similar manner. However, the system 200 of FIG. 2 replaces the bidirectional GRU layers 105, 109 with an encoder-side attention mechanism 205 and a decoder-side attention mechanism 209, respectively. For example, an encoder portion 180B of the system 200 includes the encoder-side attention mechanism 205 as opposed to the bidirectional GRU layer 105, and a decoder portion 190B of the system 200 includes the decoder-side attention mechanism 209 as opposed to the bidirectional GRU layer 109.

The encoder-side attention mechanism 205 can receive the outputs of the frontend neural network preprocessing layers 102 and receive the feedback 150 from decoded frames of a previous packet. According to one implementation, the encoder-side attention mechanism 205 includes a transformer. The encoder-side attention mechanism 205 can have direct access to each token (e.g., each input data state 122A-122E) instead of having access to neighboring tokens. For example, in FIG. 2, the encoder-side attention mechanism 205 can have direct access to each input data state 122A-122E and the feedback 150. As a result, the encoder-side attention mechanism 205 can generate the input data states 122 in a manner that accounts for data associated with the other data samples 120A, 120B, 120D, 120E and in a manner that accounts for previously encoded/decoded data samples.

The decoder-side attention mechanism 209 can receive the output data states 124A-124E from the bottlenecks 108A-108E and can receive the feedback 150 from decoded frames of a previous packet. Based on the feedback 150, the decoder-side attention mechanism 209 can perform decoding operations on the output data state 124A-124E to generate outputs that are provided to the backend neural network postprocessing layers 112 for processing. According to one implementation, the decoder-side attention mechanism 209 includes a transformer.

Figure 3:
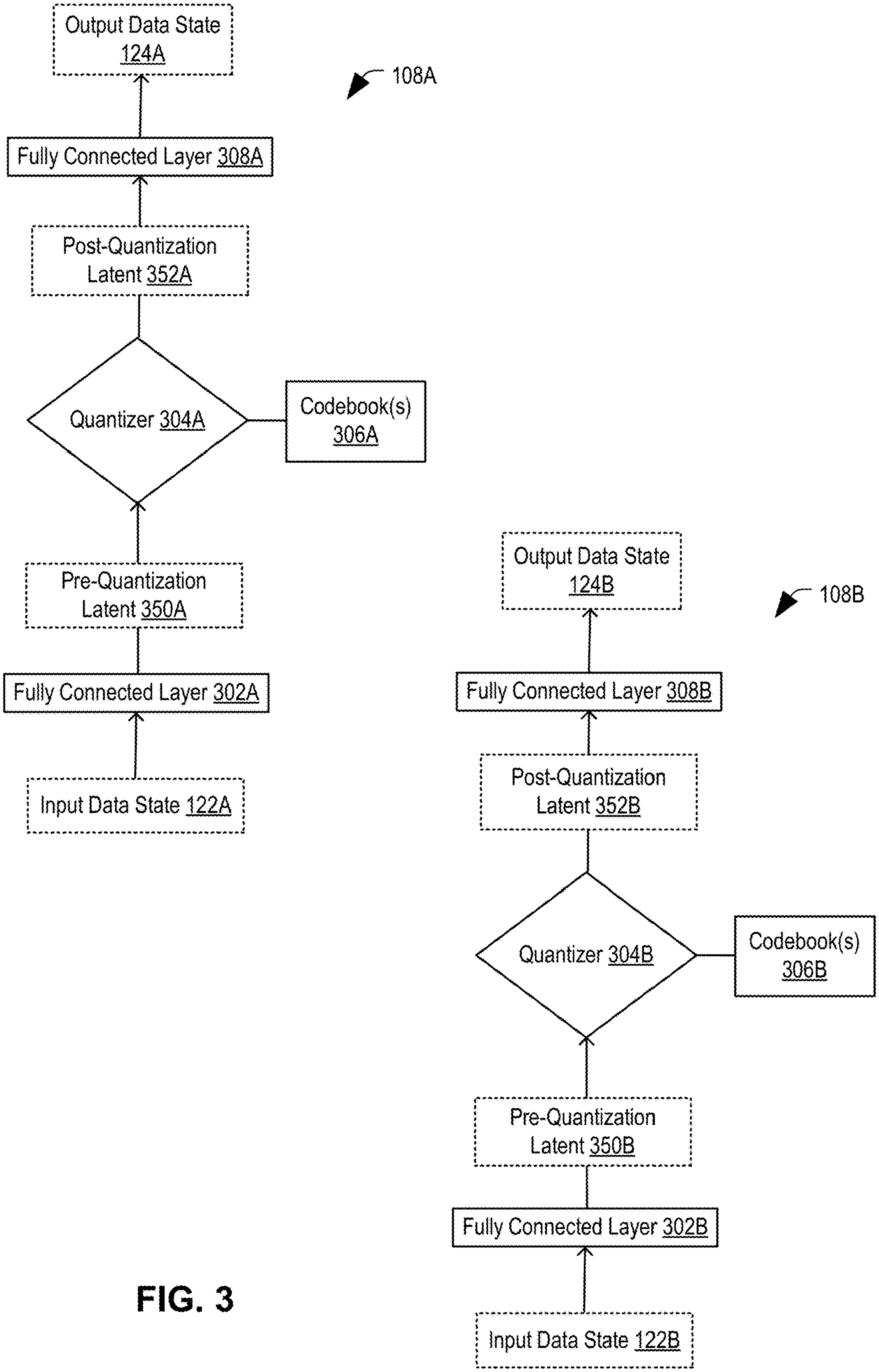
FIG. 3 is a diagram of a particular illustrative examples of bottleneck architectures that are integrated into the system of FIG. 1 or the system of FIG. 2.

FIG. 3 is a diagram of particular illustrative examples of bottleneck architectures that are integrated into the system of FIG. 1 or the system of FIG. 2. For example, a non-limiting example of the bottleneck 108A is illustrated in FIG. 3 and a non-limiting example of the bottleneck 108B is illustrated in FIG. 3. As described above, the bottleneck 108A is associated with a higher bitrate than the bottleneck 108B.

The bottleneck 108A includes a fully connected layer 302A, a quantizer 304A, one or more codebooks 306A, and a fully connected layer 308A. The input data state 122A is provided to the fully connected layer 302A. The fully connected layer 302A is configured to generate a pre-quantization latent 350A based on the input data state 122A. The pre-quantization latent 350A can correspond to an encoding indicative of an array of floating point values. The pre-quantization latent 350A is provided to the quantizer 304A. The quantizer 304A is configured to map each floating point value of the pre-quantization latent 350A to a representative value of the one or more codebooks 306A to generate a post-quantization latent 352A. According to one implementation, the post-quantization latent 352A can correspond to the output data state 124A of the bottleneck 108A. According to another implementation, the post-quantization latent 352A is provided to the fully connected layer 308A, and the fully connected layer 308A can generate the output data state 124A based on the post-quantization latent 352A.

The bottleneck 108B includes a fully connected layer 302B, a quantizer 304B, one or more codebooks 306B, and a fully connected layer 308B. The input data state 122B is provided to the fully connected layer 302B. The fully connected layer 302B is configured to generate a pre-quantization latent 350B based on the input data state 122B. The pre-quantization latent 350B can correspond to an encoding indicative of an array of floating point values. The pre-quantization latent 350B is provided to the quantizer 304B. The quantizer 304B is configured to map each floating point value of the pre-quantization latent 350B to a representative value of the one or more codebooks 306B to generate a post-quantization latent 352B. According to one implementation, the post-quantization latent 352B can correspond to the output data state 124B of the bottleneck 108B. According to another implementation, the post-quantization latent 352B is provided to the fully connected layer 308B, and the fully connected layer 308B can generate the output data state 124B based on the post-quantization latent 352B.

As described above with respect to FIG. 1, the bottleneck 108B is associated with the first bitrate and the bottleneck 108A is associated with the second bitrate that is greater than the first bitrate. That is, because more bits are used to encode the input data state 122A (e.g., the input data state associated with the data sample 120A) into a reference frame than to encode the input data state 122B (e.g., the input data state associated with the data sample 120*b*) into a predicted data frame, the bitrate of the bottleneck 108A associated with the data sample 120A is higher than the bitrate of the bottlenecks 108 associated with the other data samples. According to one implementation, to reduce the bitrate of the bottleneck 108B compared to the bitrate of the bottleneck 108A, a smaller number of bits (e.g., units) is allocated to latent codes generated at the bottleneck 108B compared to the number of units allocated to latent codes generated at the bottleneck 108A. For example, the post-quantization latent 352B can have a smaller number of units (e.g., bits) than the post-quantization latent 352A. Additionally, or in the alternative, to reduce the bitrate of the bottleneck 108B compared to the bitrate of the bottleneck 108A, the one or more codebooks 306B associated with the bottleneck 108B can have a smaller size (or can allocate a smaller number of bits) than the one or more codebooks 306A associated with the bottleneck 108A. In some scenarios, to reduce the bitrate of the bottleneck 108B compared to the bitrate of the bottleneck 108A, a smaller number of quantization stages can be used at the bottleneck 108B compared to the number of quantization stages used at the bottleneck 108B.

FIG. 4 is a diagram of a particular illustrative example of a system 400 that is operable to bundle frames generated at different bitrates into a packet. The system 400 includes a frame generator 402 and a packet generator 404. Components of the system 400 can be integrated into a transmitting device that includes the system 100 of FIG. 1 or the system 200 of FIG. 2.

The frame generator 402 is configured to receive the output data state 124A-124E from each bottleneck 108A-108E and generate corresponding frames 420A-420E. To illustrate, the frame generator 402 can generate the frame 420A based on the output data state 124A. For example, the output data state 124A can correspond to an encoded version of the data sample 120A that is included in the frame 420A. The frame generator 402 can also generate the frame 420B based on the output data state 124B. For example, the output data state 124B can correspond to an encoded version of the data sample 120B that is included in the frame 420B. The frame generator 402 can also generate the frame 420C based on the output data state 124C. For example, the output data state 124C can correspond to an encoded version of the data sample 120C that is included in the frame 420C. The frame generator 402 can also generate the frame 420D based on the output data state 124D. For example, the output data state 124D can correspond to an encoded version of the data sample 120D that is included in the frame 420D. The frame generator 402 can also generate the frame 420*e* based on the output data state 124E. For example, the output data state 124E can correspond to an encoded version of the data sample 120E that is included in the frame 420E.

As described above, the frame 420A can correspond to a reference frame that includes more bits than the frames 420B-420E. Because of the additional bits associated with the reference frame 420A, the bottleneck 108A associated with generation of the corresponding output data state 124A operates at a higher bitrate than the bottlenecks 108B-108E associated with generation of the other output data states 124B-124E.

The packet generator 404 is configured to receive each frame 420A-420E from the frame generator 402. The packet generator 404 can further be configured to bundle the frames 420A-420E into the packet 430 to be transmitted to a receiving device. For example, the packet generator 404 can operate as a frame bundler that bundles (e.g., combines) the frames 420A-420E into a single packet 430. Because the frames 420A-420E are jointly encoded and temporal redundancies are exploited during the encoding process, the frames 420A-420E are smaller in size than frames generated without exploiting temporal redundancies and the number of bits that make up the packet 430 is reduced.

Figure 5:
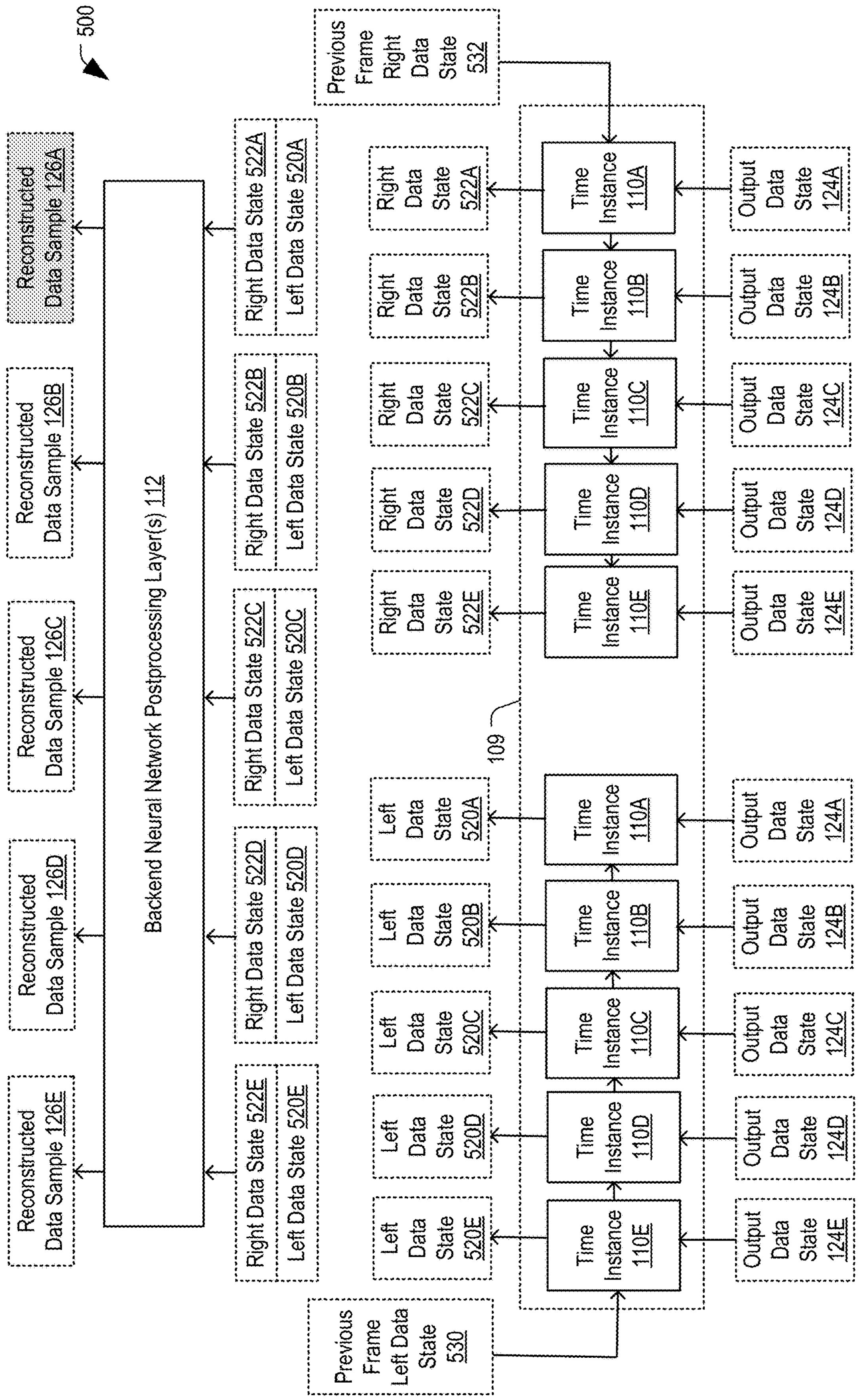
FIG. 5 is a diagram of a particular illustrative example of a system that is operable to decode bottleneck outputs generated at different bitrates.

FIG. 5 is a diagram of a particular illustrative example of a system 500 that is operable to decode bottleneck outputs generated at different bitrates. According to one implementation, the system 500 can correspond to the decoder portion 190A of the system 100. According to another implementation, the system 500 can correspond to a standalone decoder in a receiving device that receives the packet 430.

The system 500 includes the bidirectional GRU layer 109 and the one or more backend neural network postprocessing layers 112. At each time instance 110, the bidirectional GRU layer 109 is configured to generate left and right hidden data states to facilitate decoding of the data samples 120. Thus, in the example of FIG. 5, the bidirectional GRU layer 109 is illustrated as generating left data states 520 and right data states 522 at different time instances 110.

The bidirectional GRU layer 109 can be initialized based on a data state from a previous frame or packet. For example, at the time instance 110, the bidirectional GRU layer 109 can receive a left data state 530 from a previous frame and a right data state 532 from the previous frame. According to one implementation, the data states 530, 532 from the previous frame correspond to the feedback 150 provided to the bidirectional GRU layer 109. The bidirectional GRU layer 109 can use the data states 530, 532 from the previous frame used in a manner that accounts for previously encoded/decoded data samples.

Based on left data state 530 from the previous frame and the output data state 124E, the bidirectional GRU layer 109 is configured to generate a left data state 520E. According to some implementations, the bidirectional GRU layer 109 can generate the left data state 520E based on a left data state 520D. Based on the left data state 520E, the output data state 124D, the left data state 520C, or a combination thereof, the bidirectional GRU layer 109 is configured to generate the left data state 520D. Based on the left data state 520D, the output data state 124C, the left data state 520B, or a combination thereof, the bidirectional GRU layer 109 is configured to generate the left data state 520C. Based on the left data state 520C, the output data state 124B, the left data state 520A, or a combination thereof, the bidirectional GRU layer 109 is configured to generate the left data state 520B. Based on the left data state 520B, the output data state 124A, or both, the bidirectional GRU layer 109 is configured to generate the left data state 520A.

Based on right data state 532 from the previous frame and the output data state 124A, the bidirectional GRU layer 109 is configured to generate a right data state 522A. According to some implementations, the bidirectional GRU layer 109 can generate the right data state 522A based on a right data state 522B. Based on the right data state 522A, the output data state 124B, the right data state 522C, or a combination thereof, the bidirectional GRU layer 109 is configured to generate the right data state 522B. Based on the right data state 522B, the output data state 124C, the right data state 522D, or a combination thereof, the bidirectional GRU layer 109 is configured to generate the right data state 522C. Based on the right data state 522C, the output data state 124D, the right data state 522E, or a combination thereof, the bidirectional GRU layer 109 is configured to generate the right data state 522D. Based on the right data state 522D, the output data state 124E, or both, the bidirectional GRU layer 109 is configured to generate the right data state 522E.

The left data state 520A and the right data state 522A can be provided to the one or more backend neural network postprocessing layers 112, and the one or more backend neural network postprocessing layers 112 are configured to generate the reconstructed data sample 126A based on the data states 520A, 522A. In a similar manner, the left data state 520B and the right data state 522B can be provided to the one or more backend neural network postprocessing layers 112, and the one or more backend neural network postprocessing layers 112 are configured to generate the reconstructed data sample 126B based on the data states 520B, 522B. Similarly, the left data state 520C and the right data state 522C can be provided to the one or more backend neural network postprocessing layers 112, and the one or more backend neural network postprocessing layers 112 are configured to generate the reconstructed data sample 126C based on the data states 520C, 522C.

In a similar manner, the left data state 520D and the right data state 522D can be provided to the one or more backend neural network postprocessing layers 112, and the one or more backend neural network postprocessing layers 112 are configured to generate the reconstructed data sample 126D based on the data states 520D, 522D. Similarly, the left data state 520E and the right data state 522E can be provided to the one or more backend neural network postprocessing layers 112, and the one or more backend neural network postprocessing layers 112 are configured to generate the reconstructed data sample 126E based on the data states 520E, 522E.

It should be appreciated that the system 500 of FIG. 5 enables the bidirectional GRU layer 109 to jointly decode the frames 420 (e.g., the output data states 124 in the frames 420) of the packet 430 based on knowledge of "future" frames. For example, the bidirectional GRU layer 109 can access and use data states 520, 522 associated with future frames or time steps to generate a respective data state 520, 522.

Figure 6:
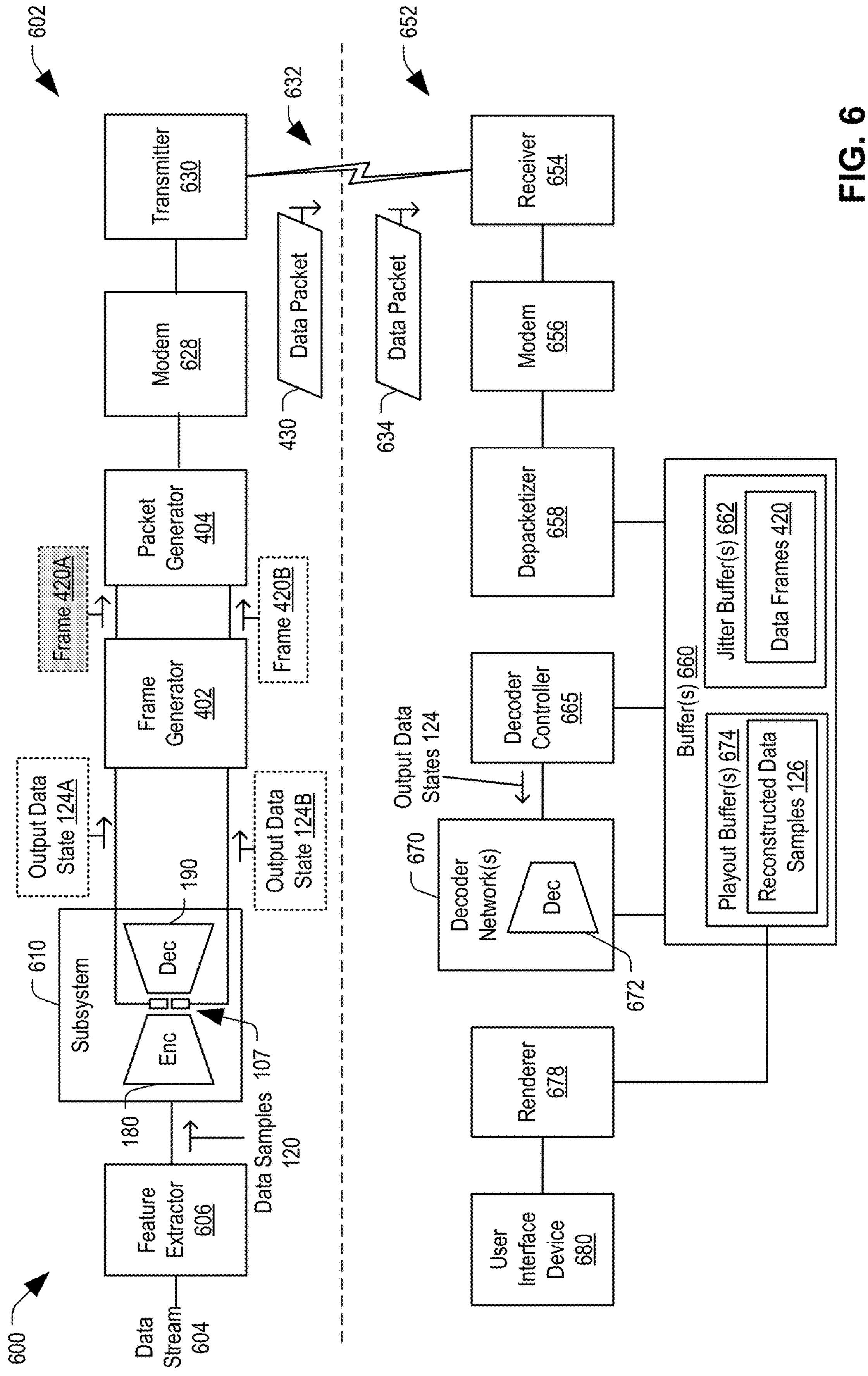
FIG. 6 is a diagram of a particular illustrative example of a system that includes two or more devices configured to communicate via transmission of encoded data.

FIG. 6 is a diagram of a particular illustrative example of a system 600 including two or more devices configured to communicate via transmission of encoded data. The example of FIG. 6 shows a first device 602 that is configured to encode and transmit data and a second device 652 that is configured to receive, decode, and use the data. For ease of reference herein, the first device 602 is also referred to herein as an encoding device and/or a transmitting device, and the second device 652 is also referred to herein as a decoding device and/or receiving device. Although the system 600 illustrates one transmitting device 602, the system 600 can include more than one transmitting device 602. For example, a two-way communication system may include two devices (e.g., mobile phones), and each of the devices may transmit data to and receive data from the other device. That is, each device may act as both a transmitting device 602 and a receiving device 652. In another example, a single receiving device 652 can receive data from more than one transmitting device 602. Additionally, or alternatively, the system 600 can include more than one receiving device 652. For example, a single transmitting device 602 may transmit (e.g., multicast or broadcast) data to multiple receiving devices 652. Thus, the one-to-one pairing of the transmitting device 602 and the receiving device 652 illustrated in FIG. 6 is merely illustrative of one configuration and is not limiting.

In the example of FIG. 6, the transmitting device 602 includes a plurality of components arranged to obtain data from a data stream 604 and to process the data to generate data packets (e.g., a data packet 634 and the data packet 430) that are transmitted over a transmission medium 632. In FIG. 6, the components of the transmitting device 602 include a feature extractor 606, a subsystem 610, the frame generator 402, the packet generator 404, a modem 628, and a transmitter 630. The subsystem 610 can correspond to the system 100 of FIG. 1, the system 200 of FIG. 2, or both. In other examples, the transmitting device 602 may include more, fewer, or different components. To illustrate, in some examples, the transmitting device 602 includes one or more data generation devices configured to generate the data stream 604. Examples of such data generation devices include, for example and without limitation, microphones, cameras, game engines, media processors (e.g., computer-generated imagery engines), augmented reality engines, sensors, or other devices and/or instructions that are configured to output the data stream 604. To further illustrate, in some examples, the transmitting device 602 includes a transceiver instead of the transmitter 630 (or in which the transmitter 630 is disposed).

The data stream 604 in FIG. 1 includes data arranged in a time series. For example, the data stream 604 may include a sequence of data frames, where each data frame represents a time-windowed portion of data. In some examples, the data includes media data, such as voice data, audio data, video data, game data, augmented reality data, other media data, or combinations thereof.

The feature extractor 606 is configured to generate the data samples 120 based on the data stream 604. The data samples 120 include data representing a portion (e.g., a single data frame, multiple data frames, or a segment or subset of a data frame) of the data stream 604. The feature extraction technique(s) used by the feature extractor 606 may include, for example, data aggregation, interpolation, compression, windowing, domain transformation, sampling, smoothing, statistical analysis, etc. To illustrate, when the data stream 604 includes voice data or other audio data, the feature extractor 606 may be configured to determine time-domain or frequency-domain spectral information descriptive of a time-windowed portion of the data stream 604. In this example, the data samples 120 may include the spectral information. As one non-limiting example, the data samples 120 may include data describing a cepstrum of voice data of the data stream 604, data describing pitch associated with the voice data, other data indicating characteristics of the voice data, or a combination thereof. As another illustrative example, when the data stream 604 includes video data, game data, or both, the feature extractor 606 may be configured to determine pixel information associated with an image frame of the data stream 604. In the same or other examples, the data samples 120 may include other information, such as metadata associated with the data stream 604, compression data (e.g., keyframe identifiers), or other information used by the subsystem 610 to encode the data samples 120.

The subsystem 610 includes an encoder portion 180 of a bundled multi-rate feedback autoencoder. The encoder portion 180 can correspond to the encoder portion 180A of system 100, the encoder portion 180B of the system 200, or both. In some implementations, the encoder portion 180 can include the bottleneck layer 107. In other implementations, the bottleneck layer 107 can be coupled to the encoder portion 180. In a similar manner as described with respect to FIGS. 1-2, the encoder portion 180 can generate the input data states 122A-122E (not illustrated in FIG. 6) that are provided to the bottleneck layer 107. The bottleneck layer 107 can generate the output data states 124A-124E based on the input data states 122A-122E. As described above, the bottleneck layer 107 can include multiple bottlenecks 108 that are associated with different bitrates to facilitate encoding frames having different bit sizes at a similar frequency. For ease of illustration, FIG. 6 depicts the output data state 124A and the output data state 124B. However, it should be understood that the bottleneck layer 107, as depicted in FIG. 6, can also generate the other output data states 124C-124E, as described above. The output data states 124A, 124B are provided to the frame generator 402. The subsystem 610 can also include a decoder portion 190 of the bundled multi-rate feedback autoencoder. The decoder portion 190 can operate in a substantially similar manner as the system 500 of FIG. 5.

The frame generator 402 is configured to generate the frame 420A (e.g., the reference frame) and the frame 420B (e.g., the predicted frame). It should be understood that the frame generator 402 can generate additional frames (e.g., the frames 420C-420E), as described with respect to FIG. 4. The frames 420A, 420B are provided to the packet generator 404. The packet generator 404 is configured to generate the packet 430 based on the frames 420A, 420B (and the other frames 420C-420E not depicted in FIG. 6).

The modem 628 is configured to modulate a baseband, according to a particular communication protocol, to generate signals representing the packet 430 and a previous packet 634. The transmitter 630 is configured to send the signals representing the packets 430, 634 via the transmission medium 632. The transmission medium 632 may include a wireline medium, an optical medium, or a wireless medium. To illustrate, the transmitter 630 may include or correspond to a wireless transmitter configured to send the signals via free-space propagation of electromagnetic waves.

According to one implementation, bitrates of the bottlenecks 108 in the bottleneck layer 107 can be dynamically changed based on network conditions associated with the transmission medium 632. As a non-limiting example, if the network is congested such that packets are more frequently lost or delayed, the bitrates can be increased to allocate additional bits to the frames. As another example, if the network has a relatively large bandwidth such that packets are rarely lost or delayed, the bitrates can be decreased.

In the example of FIG. 6, the receiving device 652 is configured to receive the packets 430, 634 from the transmitting device 602. As noted above, the transmission medium 632 may be lossy. For example, one or more of the packets 430, 634 may be delayed during transmission or never received at the receiving device 652. The receiving device 652 includes a plurality of components arranged to process the packets 430, 634 that are received and to generate output based on the received packets 430, 634.

In FIG. 6, the components of the receiving device 652 include a receiver 654, a modem 656, a depacketizer 658, one or more buffers 660, a decoder controller 665 one or more decoder networks 670, a renderer 678, and a user interface device 680. In other examples, the receiving device 652 may include more, fewer, or different components. To illustrate, in some examples, the receiving device 652 includes more than one user interface device 680, such as one or more displays, one or more speakers, one or more haptic output devices, etc. To further illustrate, in some examples, the receiving device 652 includes a transceiver instead of the receiver 654 (or in which the receiver 654 is disposed).

The receiver 654 is configured to receive the signals representative of packets 430, 634 and to provide the signals (after initial signal processing, such as amplification, filtering, etc.) to the modem 656. As noted above, the receiving device 652 may not receive all of the packets 430, 634 sent by the transmitting device 602. Additionally, or in the alternative, the packets 430, 634 may be received in a different order than they are transmitted by the transmitting device 602.

The modem 656 is configured to demodulate the signals to generate bits representing the received packets 430, 634 and to provide the bits representing the received data packets to the depacketizer 658. The depacketizer 658 is configured to extract one or more data frames 420 from the payload of each received packets 430, 634 and to store the frames 420 at the buffer(s) 660. For example, in FIG. 6, the buffer(s) 660 include a jitter buffer(s) 662 configured to store the data frames 420. The buffer(s) 660 store the data frame 420 to enable reordering of the data frames 420, to allow time for delayed data frames to arrive, etc.

In the example illustrated in FIG. 6, a decoder controller 665 retrieves data from the buffer(s) 660 to generate the output data states 124 for the decoder network(s) 670. In some implementations, the decoder controller 665 also performs buffer management operations, such as managing a depth of the jitter buffer(s) 662, a depth of a playout buffer(s) 674, or both. If the decoder network(s) 670 include multiple decoders, the decoder controller 665 may also determine which of the decoders to use at a particular time.

To decode a particular data sample, the decoder controller 665 extracts the output data states 124 from the frames 420 and provides the output data states 124 to a decoder 672 of the decoder networks 670. The decoder 672 can include the components of the system 500 and can operate in a substantially similar manner. For example, the decoder 672 can generate the reconstructed data samples 126 based on the output data states 124 in a similar manner as described with respect to FIG. 5.

The reconstructed data samples 126 may be stored at the buffer(s) 660 (e.g., at one or more playout buffers 674). At a playback time, the renderer 678 retrieves the reconstructed data samples 126 from the buffer(s) 660 and processes the reconstructed data samples 126 to generate output signals, such as audio signals, video signals, game update signals, etc. The renderer 678 provides the signals to a user interface device 680 to generate a user perceivable output based on the reconstructed data samples 126. For example, the user perceivable output may include one or more of a sound, an image, or a vibration. In some implementations, the renderer 678 includes or corresponds to a game engine that generates the user perceivable output in response to modifying a game state based on the reconstructed data samples 126.

Figure 7:
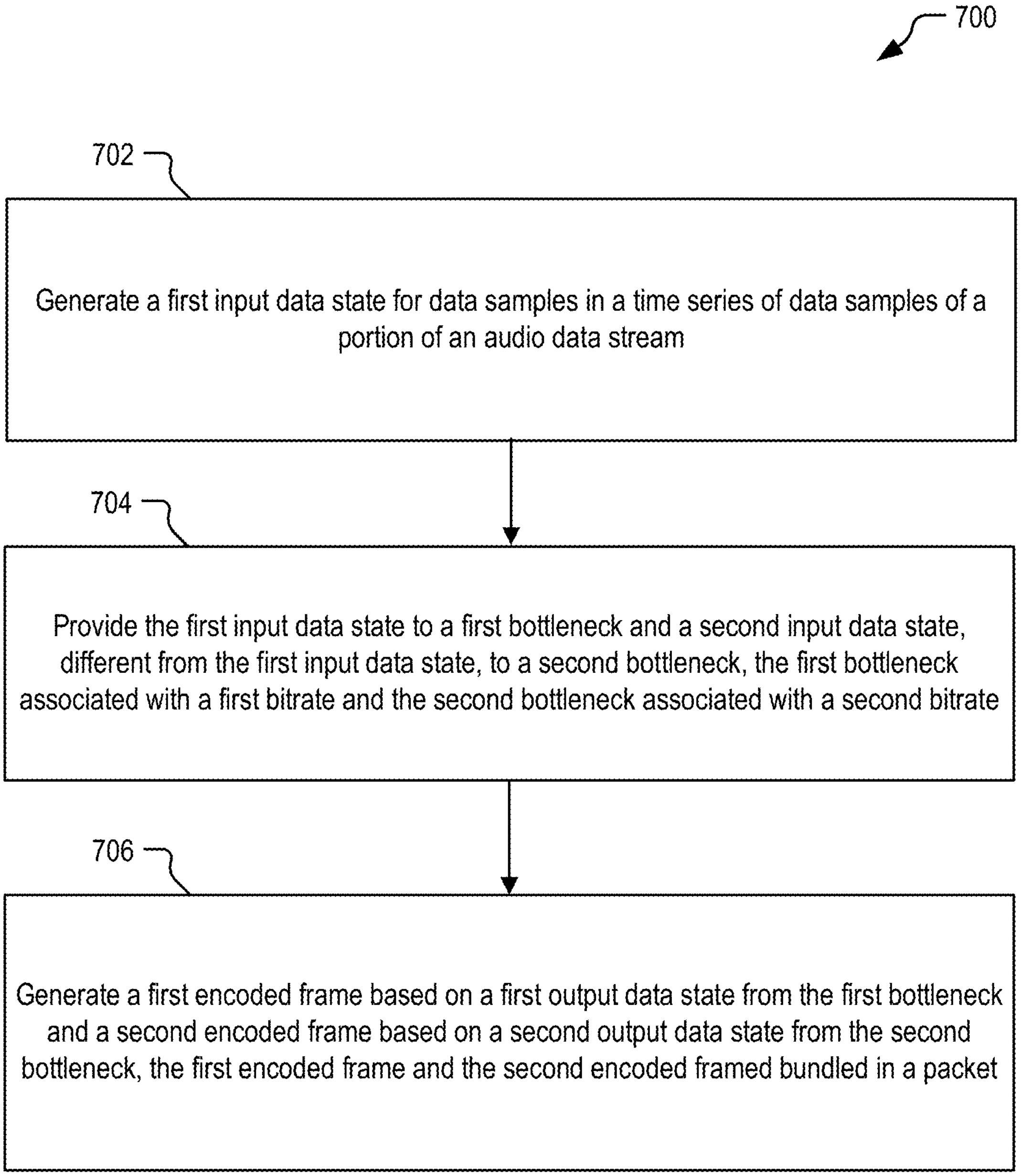
FIG. 7 is a flowchart of a particular example of a method of operation of an encoding device.

FIG. 7 is a flowchart of a particular example of a method 700 of operation of an encoding device. In various implementations, the method 700 may be performed by one or more of the system 100 of FIG. 1, the system 200 of FIG. 2, the bottlenecks 108A, 108B of FIG. 3, the system 400 of FIG. 4, or the transmitting device 602 of FIG. 6.

In the example of FIG. 7, the method 700 includes generating a first input data state for data samples in a time series of data samples of a portion of an audio data stream, at block 702. For example, referring to FIG. 1, the bidirectional GRU layer 105 can generate the input data state 122B and the input data state 122A. In this example, the input data states 122A, 122B for each data sample 120A, 120B, respectively, correspond to an encoder hidden state generated at the bidirectional GRU layer 105 of the bundled multi-rate feedback autoencoder. As another example, referring to FIG. 2, the encoder-side attention mechanism 205 can generate the input data state 122B and the input data state 122A.

The method 700 also includes providing the first input data state to a first bottleneck and a second input data state, different from the first input data state, to a second bottleneck, at block 704. The first bottleneck is associated with a first bitrate and the second bottleneck is associated with a second bitrate. According to some implementations, the second bitrate is distinct from the first bitrate. For example, referring to FIGS. 1-2, the input data state 122B is provided to the bottleneck 108B and the input data state 122A is provided to the bottleneck 108A. The bottleneck 108B is associated with a first bitrate and the bottleneck 108A is associated with a second bitrate that is distinct from the first bitrate. For example, the first bitrate can be less than a second bitrate such that the bottleneck 108A can encode more bits of data than the second bottleneck during a similar time period. The bottlenecks 108A, 108B are integrated into the bottleneck layer 107 of a bundled multi-rate feedback autoencoder.

According to one implementation, the method 700 includes allocating a smaller number of units to latent codes generated at the first bottleneck than latent codes generated at the second bottleneck to reduce the bitrate of the first bottleneck. For example, referring to FIG. 3, to reduce the bitrate of the bottleneck 108B compared to the bitrate of the bottleneck 108A, a smaller number of units can be allocated to latent codes generated at the bottleneck 108B compared to the number of units allocated to latent codes generated at the bottleneck 108A. For example, the post-quantization latent 352B can have a smaller number of units than the post-quantization latent 352A.

According to one implementation of the method 700, a first codebook associated with the first bottleneck has a smaller size than a second codebook associated with the second bottleneck. For example, referring to FIG. 3, to reduce the bitrate of the bottleneck 108B compared to the bitrate of the bottleneck 108A, the codebook 306B associated with the bottleneck 108B can have a smaller size than the codebook 306A associated with the bottleneck 108A.

According to one implementation, the method 700 includes dynamically changing the first bitrate and the second bitrate based on network conditions. For example, if the network is congested such that packets are more frequently lost or delayed, the second bitrate can be increased to allocate additional bits to the reference frame 402A. As another example, if the network has a relatively large bandwidth such that packets are rarely lost or delayed, the second bitrate can be decreased.

The method 700 also includes generating a first encoded frame based on a first output data state from the first bottleneck and a second encoded frame based on a second output data state from the second bottleneck, at block 706. The first encoded frame and the second encoded frame are bundled in a packet. For example, referring to FIG. 3, the bottleneck 108B generates the output data state 124B and the bottleneck 108A generates the output data state 124A. Referring to FIG. 4, the frame generator 402 generates the encoded frame 420B based on the output data state 124B and generates the encoded frame 420A based on the output data state 124A. The encoded frames 420A, 420B are bundled in the packet 430.

The method 700 of FIG. 7 enables customized bit allocation for the encoding of different data samples 120. For example, a greater number of bits can be allocated to a reference frame data sample (e.g., the data sample 120A) than to the predicted frame data samples (e.g., the data samples 120B-120E). Thus, if the data samples 120A-120E are encoded into five respective frames (e.g., the frames 420A-420E of FIG. 4) that are bundled into a packet (e.g., the packet 430 of FIG. 4), a boundary frame (e.g., the frame 420A associated with the data sample 120A) of the packet 430 can be encoded with additional bits to be used as a reference frame. As a result, the remaining frames 420B-420E can be encoded with a relatively small amount of bits, which in turn, reduces the amount of bits used to encode bundled frames in the packet 430. In some scenarios, the system 100 can allocate zero bits to a particular data sample

120 for encoding. In these scenarios, nothing would be transmitted for the particular data sample 120 and a decoder would predict a corresponding frame based on encoded data in neighboring frames.

The method 700 of FIG. 7 may be implemented by a field-programmable gate array (FPGA) device, an application-specific integrated circuit (ASIC), a processing unit such as a central processing unit (CPU), a digital signal processor (DSP), a graphics processing unit (GPU), a controller, another hardware device, firmware device, or any combination thereof. As an example, the method 700 of FIG. 7 may be performed by a processor that executes instructions, such as described with reference to processor(s) 1110 of FIG. 11.

Figure 8:
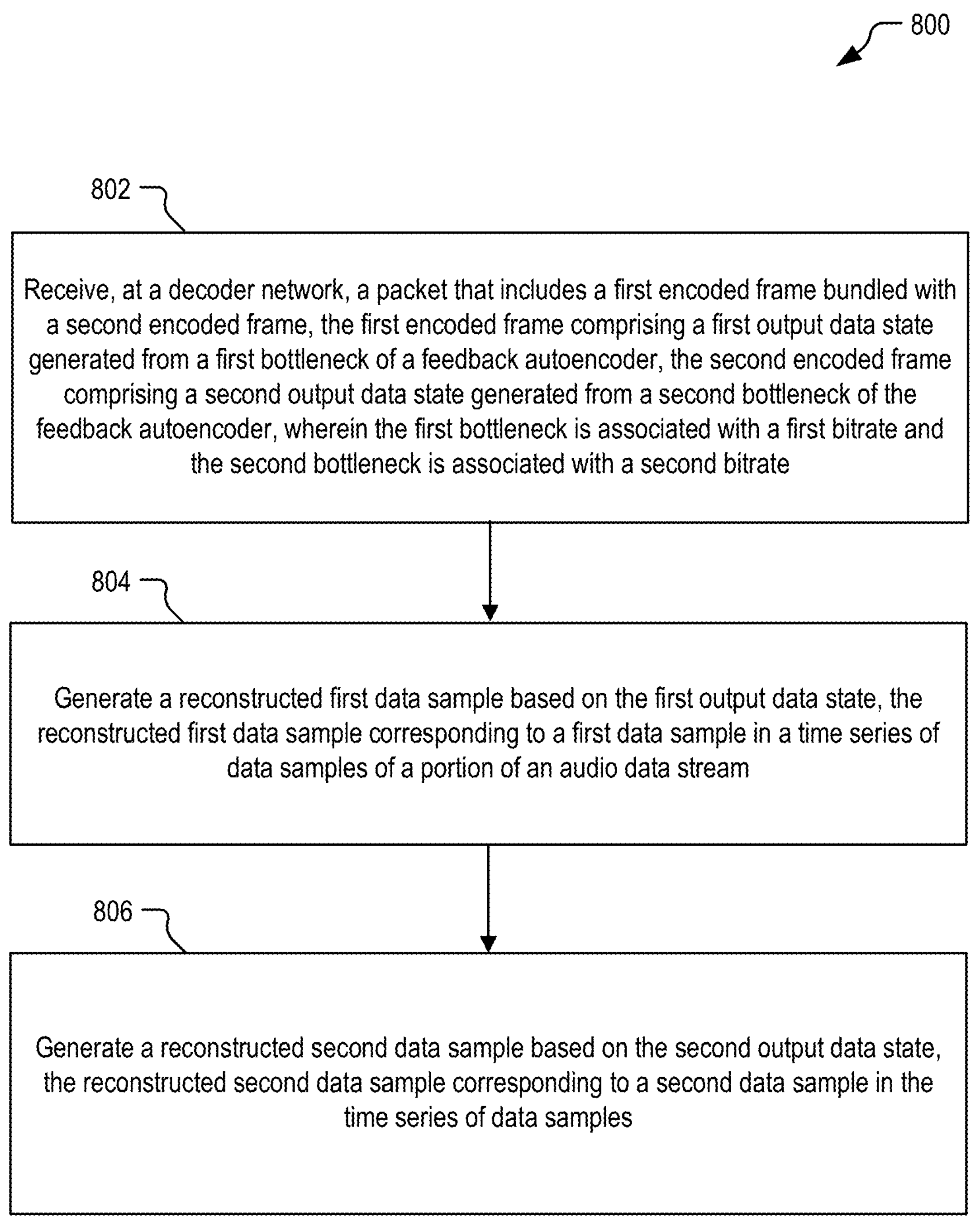
FIG. 8 is a flowchart of a particular example of a method of operation of a decoding device.

FIG. 8 is a flowchart of a particular example of a method 800 of operation of a decoding device. In various implementations, the method 800 may be performed by one or more of the system 100 of FIG. 1, the system 200 of FIG. 2, the system 500 of FIG. 5, the transmitting device 602 of FIG. 6, or the receiving device 652 of FIG. 6.

In the example of FIG. 8, the method 800 includes receiving, at a decoder network, a packet that includes a first encoded frame bundled with a second encoded frame, at block 802. The first encoded frame includes a first output data state generated from a first bottleneck of a feedback autoencoder, and the second encoded frame includes a second output data state generated from a second bottleneck of a feedback autoencoder. The first bottleneck is associated with a first bitrate and the second bottleneck is associated with a second bitrate. According to some implementations, the second bitrate is distinct from the first bitrate. For example, the receiving device 652 receives the packet 430 that includes the encoded frame 420B bundled with the encoded frame 420A. The encoded frame 420B includes the output data state 124B generated from the bottleneck 108B, and the encoded frame 420A includes the output data state 124A generated from the bottleneck 108A. The bottleneck 108B is associated with a first bitrate and the bottleneck 108A is associated with a second bitrate that is distinct from (e.g., higher than) the first bitrate.

The method 800 also includes generating a reconstructed first data sample based on the first output data state, at block 804. The reconstructed data sample corresponds to a first data sample in a time series of data samples of a portion of an audio data stream. For example, referring to FIG. 5, the GRU layer 109 and the backend neural network postprocessing layers 112 can generate the reconstructed data sample 126B based on the output data state 124B. The reconstructed data sample 126B corresponds to the data sample 120B in the time series of data samples 120 of the audio data stream 604.

The method 800 also includes generating a reconstructed second data sample based on the second output data state, at block 806. The reconstructed second data sample corresponds to a second data sample in the time series of data samples. For example, referring to FIG. 5, the GRU layer 109 and the backend neural network postprocessing layers 112 can generate the reconstructed data sample 126A based on the output data state 124A. The reconstructed data sample 126A corresponds to the data sample 120A in the time series of data samples 120 of the audio data stream 604.

The method 800 of FIG. 8 may be implemented by a FPGA device, an ASIC, a processing unit such as a CPU, a DSP, a GPU, a controller, another hardware device, firmware device, or any combination thereof. As an example, the method 800 of FIG. 8 may be performed by a processor that executes instructions, such as described with reference to processor(s) 1110 of FIG. 11.

Figure 9:
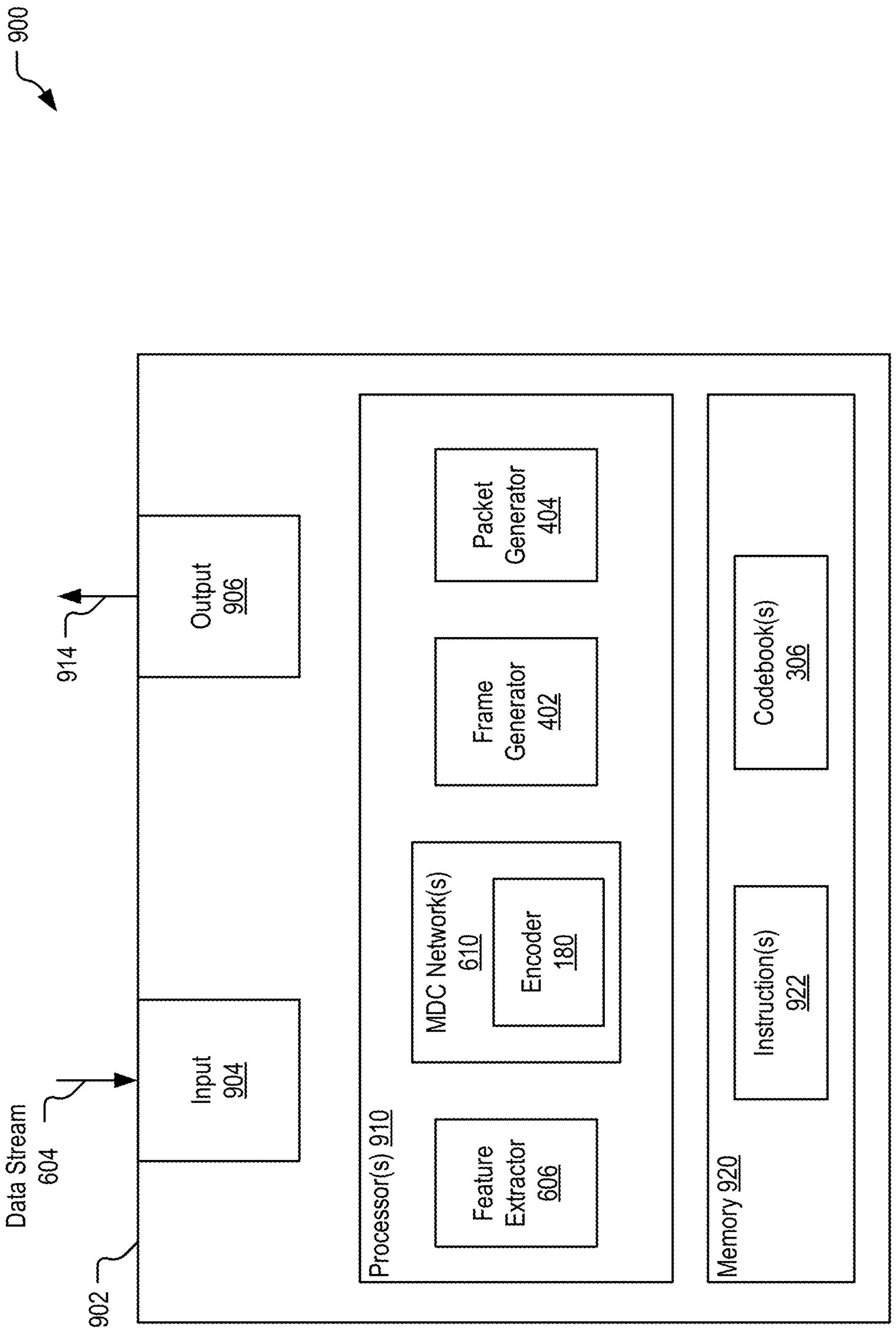
FIG. 9 is a diagram of a particular example of components of an encoding device of FIG. 1 in an integrated circuit.

FIG. 9 depicts an implementation 900 in which a device 902 includes one or more processors 910 that include components of the transmitting device 602 of FIG. 6. The device 902 also includes an input interface 904 (e.g., one or more bus or wireless interfaces) configured to receive input data, such as the data stream 604, and an output interface 906 (e.g., one or more bus or wireless interfaces) configured to output data 914, such as the packet 430. The device 902 may correspond to a system-on-chip or other modular device that can be integrated into other systems to provide data encoding, such as within a mobile phone, another communication device, an entertainment system, or a vehicle, as illustrative, non-limiting examples. According to some implementations, the device 902 may be integrated into a server, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a headset, an augmented reality headset, a mixed reality headset, a virtual reality headset, a motor vehicle such as a car, or any combination thereof.

In the illustrated implementation 900, the device 902 includes a memory 920 (e.g., one or more memory devices) that includes instructions 922 and one or more codebooks 306. The device 902 also includes one or more processors 910 coupled to the memory 920 and configured to execute the instructions 922 from the memory 920. In this implementation 900, the feature extractor 606, the subsystem 610, the encoder portion 180 of the bundled multi-rate feedback autoencoder, the frame generator 402, and the packet generator 404 may correspond to or be implemented via the instructions 922. For example, when the instructions 922 are executed by the processor(s) 910, the processor(s) 910 may generate an input data state 122A-122E for each data sample 120A-120E in a time series of data samples 120 of a portion of an audio data stream. The processor(s) 910 may also provide at least one input data state 122B to a first bottleneck 108B and at least one other input data state 122A to a second bottleneck 108A. The first bottleneck 108B can be associated with a first bitrate and the second bottleneck 108A can be associated with a second bitrate that is distinct from the first bitrate. The processor(s) 910 may also generate a first encoded frame 420B based on a first output data state 124B from the first bottleneck 108B and a second encoded frame 420A based on a second output data state 124A from the second bottleneck 108A. The first encoded frame 420B and the second encoded frame 420A are bundled in a packet 430.

Figure 10:
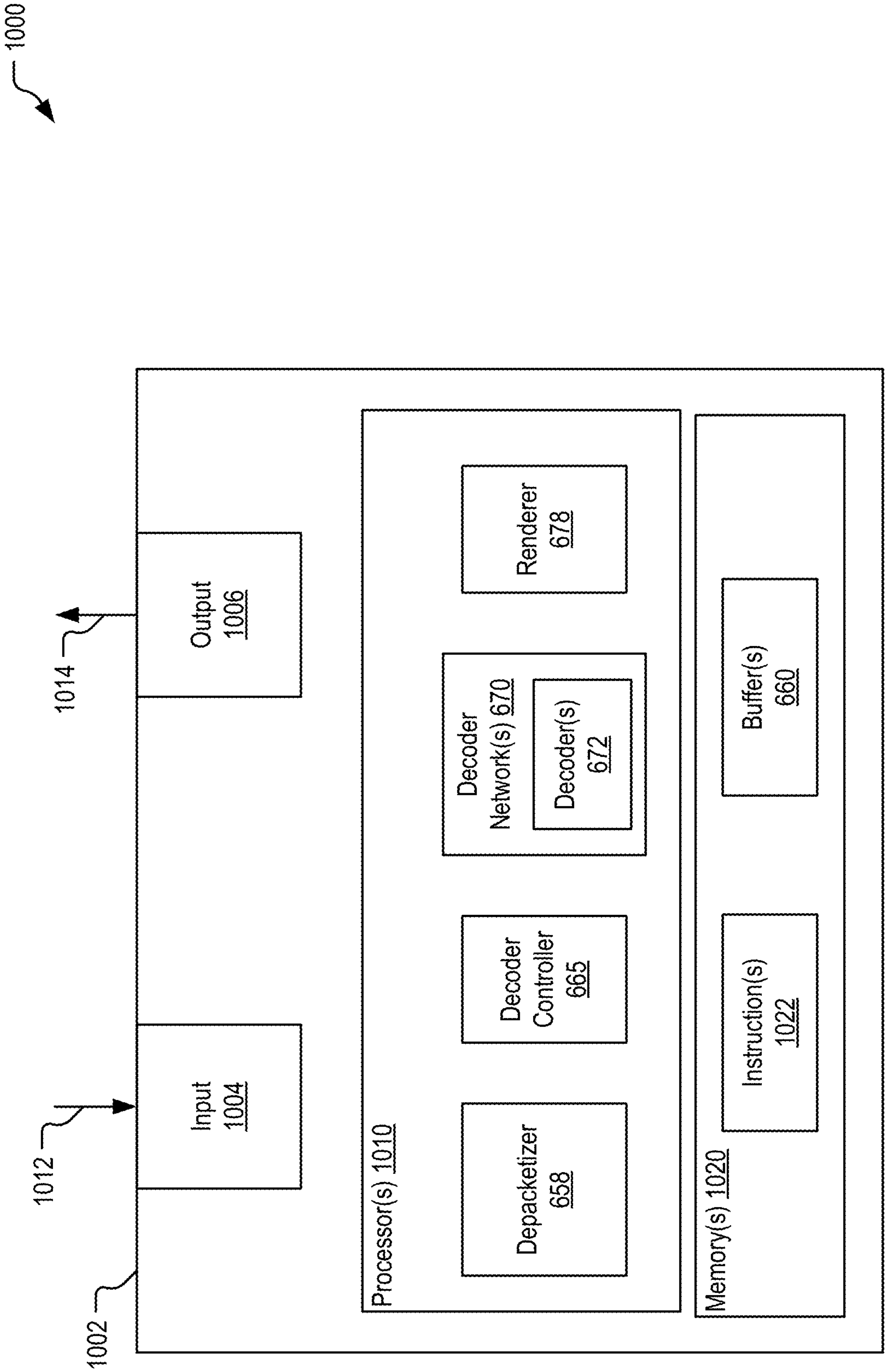
FIG. 10 is a diagram of a particular example of components of a decoding device of FIG. 1 in an integrated circuit.

FIG. 10 depicts an implementation 1000 in which a device 1002 includes one or more processors 1010 that include components of the receiving device 652 of FIG. 6. The device 1002 also includes an input interface 1004 (e.g., one or more bus or wireless interfaces) configured to receive input data 1012, such as the packet 430 from the receiver 654 of FIG. 6, and an output interface 1006 (e.g., one or more bus or wireless interfaces) configured to provide output 1014 based on the input data 1012, such as signals provided to the user interface device 680 of FIG. 6. The device 1002 may correspond to a system-on-chip or other modular device that can be integrated into other systems to provide data decoding, such as within a mobile phone, another communication device, an entertainment system, or a vehicle, as illustrative, non-limiting examples. According to some implementations, the device 1002 may be integrated into a server, a mobile communication device, a smart phone, a cellular phone, a laptop computer, a computer, a tablet, a personal digital assistant, a display device, a television, a gaming console, a music player, a radio, a digital video player, a DVD player, a tuner, a camera, a navigation device, a headset, an augmented reality headset, a mixed reality headset, a virtual reality headset, a motor vehicle such as a car, or any combination thereof.

In the illustrated implementation 1000, the device 1002 includes a memory 1020 (e.g., one or more memory devices) that includes instructions 1022 and one or more buffers 660. The device 1002 also includes one or more processors 1010 coupled to the memory 1020 and configured to execute the instructions 1022 from the memory 1020. In this implementation 1000, the depacketizer 658, the decoder controller 665, the decoder network(s) 670, the decoder(s) 672, and/or the renderer 678 may correspond to or be implemented via the instructions 1022. For example, when the instructions 1022 are executed by the processor(s) 1010, the processor(s) 1010 may receive a packet 430 that includes a first encoded frame 420B bundled with a second encoded frame 420A. The first encoded frame 420B can include a first output data state 124B generated from a first bottleneck 108B of a bundled multi-rate feedback autoencoder, and the second encoded frame 420A can include a second output data state 124A generated from a second bottleneck 108A of a bundled multi-rate feedback autoencoder. The first bottleneck can be associated with a first bitrate and the second bottleneck can be associated with a second bitrate that is distinct from the first bitrate. The processor(s) 1010 may further generate a reconstructed first data sample 126B based on the first output data state 124B. The reconstructed first data sample 126B can correspond to a first data sample 120B in a time series of data samples 120 of a portion of an audio data stream 604. The processor(s) 1010 may further generate a reconstructed second data sample 126A based on the second output data state 124A. The reconstructed second data sample 126A can correspond to a second data sample 120A in the time series of data samples 120.

Figure 11:
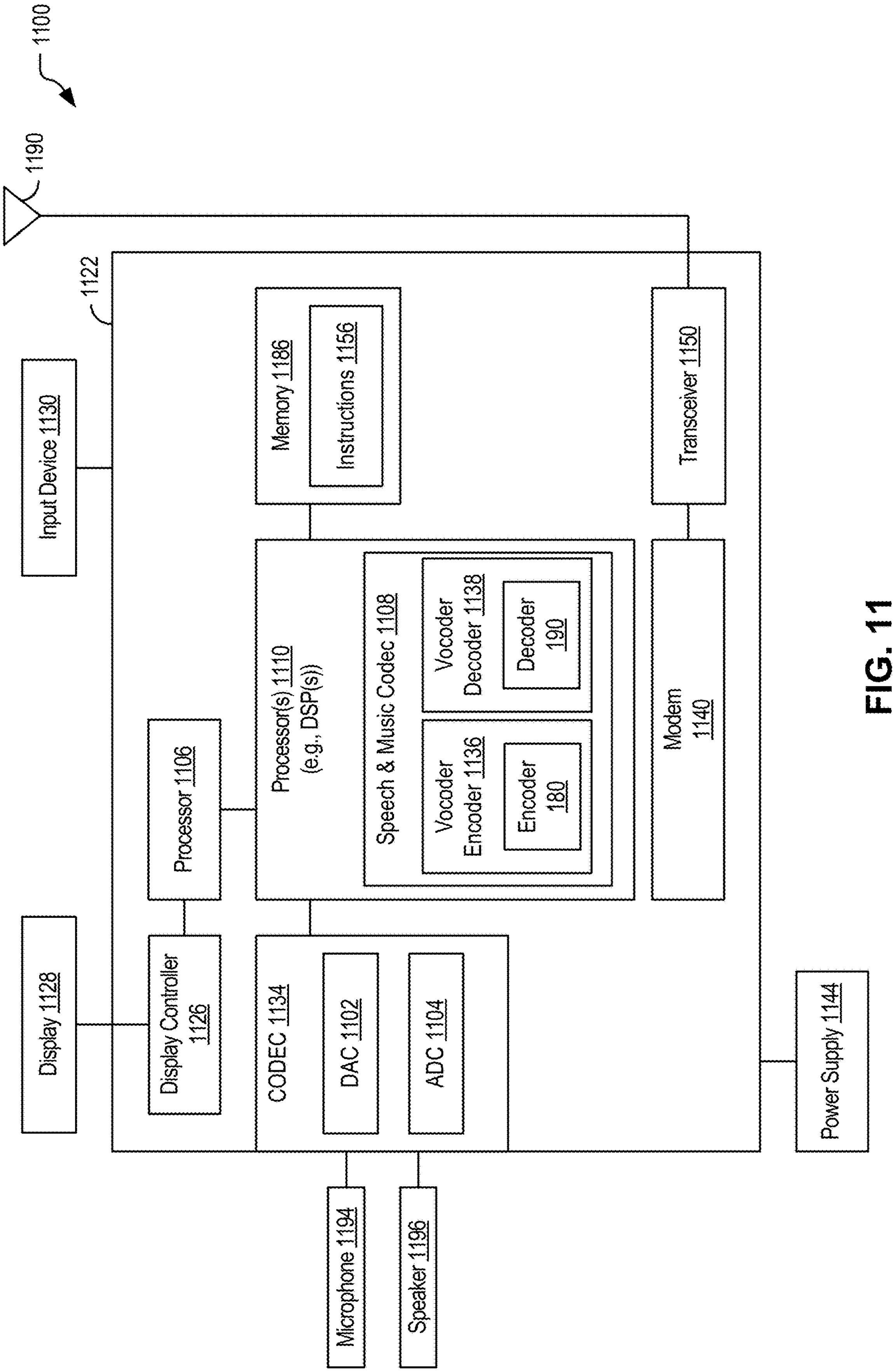
FIG. 11 is a block diagram of a particular illustrative example of a device that is operable to perform encoding, decoding, or both.

Referring to FIG. 11, a block diagram of a particular illustrative implementation of a device is depicted and generally designated 1100. In various implementations, the device 1100 may have more or fewer components than illustrated in FIG. 11. In an illustrative implementation, the device 1100 may correspond to the transmitting device 602 of FIG. 6, the receiving device 652 of FIG. 6, or both. In an illustrative implementation, the device 1100 may perform one or more operations described with reference to FIGS. 1-10.

In a particular implementation, the device 1100 includes a processor 1106 (e.g., a CPU). The device 1100 may include one or more additional processors 1110 (e.g., one or more DSPs, one or more GPUs, or a combination thereof). The processor(s) 1110 may include a speech and music coder-decoder (CODEC) 1108. The speech and music codec 1108 may include a voice coder ("vocoder") encoder 1136, a vocoder decoder 1138, or both. In a particular aspect, the vocoder encoder 1136 includes the encoder portion 180 of the bundled multi-rate feedback autoencoder. In a particular aspect, the vocoder decoder 1138 includes the decoder portion of the bundled multi-rate feedback autoencoder.

The device 1100 also includes a memory 1186 and a CODEC 1134. The memory 1186 may include instructions 1156 that are executable by the one or more additional processors 1110 (or the processor 1106) to implement the functionality described with reference to the transmitting device 602 of FIG. 6, the receiving device 652 of FIG. 6, or both. The device 1100 may include a modem 1140 coupled, via a transceiver 1150, to an antenna 1190.

The device 1100 may include a display 1128 coupled to a display controller 1126. A speaker 1196 and a microphone 1194 may be coupled to the CODEC 1134. The CODEC 1134 may include a digital-to-analog converter (DAC) 1102 and an analog-to-digital converter (ADC) 1104. In a particular implementation, the CODEC 1134 may receive an analog signal from the microphone 1194, convert the analog signal to a digital signal using the analog-to-digital converter 1104, and provide the digital signal to the speech and music codec 1108 (e.g., as the data stream 604 of FIG. 6). The speech and music codec 1108 may process the digital signals. In a particular implementation, the speech and music codec 1108 may provide digital signals (e.g., output from the renderer 678 of FIG. 6) to the CODEC 1134. The CODEC 1134 may convert the digital signals to analog signals using the digital-to-analog converter 1102 and may provide the analog signals to the speaker 1196.

In a particular implementation, the device 1100 may be included in a system-in-package or system-on-chip device 1122 that corresponds to the transmitting device 602 of FIG. 6, the system 100 of FIG. 1, the system 200 of FIG. 2, the system 400 of FIG. 4, the device 902 of FIG. 9, or any combination thereof. Additionally, or alternatively, the system-in-package or system-on-chip device 1122 corresponds to the receiving device 652 of FIG. 1, the system 100 of FIG. 1, the system 200 of FIG. 2, the system 500 of FIG. 5, the device 1002 of FIG. 10, or any combination thereof.

In a particular implementation, the memory 1186, the processor 1106, the processors 1110, the display controller 1126, the CODEC 1134, and the modem 1140 are included in the system-in-package or system-on-chip device 1122. In a particular implementation, an input device 1130 and a power supply 1144 are coupled to the system-in-package or system-on-chip device 1122. Moreover, in a particular implementation, as illustrated in FIG. 11, the display 1128, the input device 1130, the speaker 1196, the microphone 1194, the antenna 1190, and the power supply 1144 are external to the system-in-package or system-on-chip device 1122. In a particular implementation, each of the display 1128, the input device 1130, the speaker 1196, the microphone 1194, the antenna 1190, and the power supply 1144 may be coupled to a component of the system-in-package or system-on-chip device 1122, such as an interface or a controller. In some implementations, the device 1100 includes additional memory that is external to the system-in-package or system-on-chip device 1122 and coupled to the system-in-package or system-on-chip device 1122 via an interface or controller.

The device 1100 may include a smart speaker (e.g., the processor 1106 may execute the instructions 1156 to run a voice-controlled digital assistant application), a speaker bar, a mobile communication device, a smart phone, a cellular phone, a laptop computer, a computer, a tablet, a personal digital assistant, a display device, a television, a gaming console, a music player, a radio, a digital video player, a DVD player, a tuner, a camera, a navigation device, a headset, an augmented realty headset, a mixed reality headset, a virtual reality headset, a vehicle, or any combination thereof.

In conjunction with the described implementations, an apparatus includes means for generating a first input data state for data samples in a time series of data samples of a portion of an audio data stream. For example, the means for generating the input data states includes the frontend neural network preprocessing layers 102, the bidirectional GRU layer 105, the encoder-side attention mechanism 205, the encoder portion 180 of the bundled multi-rate feedback autoencoder, the transmitting device 602, the device 902, the processor(s) 910, the processor 1106, the processor(s) 1110, the speech and music codec 1108, the vocoder decoder 1138, one or more other circuits or components configured to generate the input data states, or any combination thereof.

The apparatus also includes means for providing the first input data state to a first bottleneck and a second input data state, different from the first input data state, to a second bottleneck. The first bottleneck is associated with a first bitrate and the second bottleneck is associated with a second bitrate that is distinct from the first bitrate. For example, the means for providing includes the frontend neural network preprocessing layers 102, the bidirectional GRU layers 105, the encoder-side attention mechanism 205, the encoder portion 180 of the bundled multi-rate feedback autoencoder, the transmitting device 602, the device 902, the processor(s) 910, the processor 1106, the processor(s) 1110, the speech and music codec 1108, the vocoder decoder 1138, one or more other circuits or components configured to provide the input data states to bottlenecks, or any combination thereof.

The apparatus further includes means for generating a first encoded frame based on a first output data state from the first bottleneck and a second encoded frame based on a second output data state from the second bottleneck. The first encoded frame and the second encoded frame are bundled in a packet. For example, the means for generating includes the frame generator 402, the transmitting device 602, the device 902, the processor(s) 910, the processor 1106, the processor(s) 1110, the speech and music codec 1108, the vocoder decoder 1138, one or more other circuits or components configured to generate the first and second encoded frames, or any combination thereof.

In conjunction with the described implementations, an apparatus includes means for receiving a packet that includes a first encoded frame bundled with a second encoded frame. The first encoded frame includes a first output data state generated from a first bottleneck of a feedback autoencoder, and the second encoded frame includes a second output data state generated from a second bottleneck of a feedback autoencoder. The first bottleneck is associated with a first bitrate, and the second bottleneck is associated with a second bitrate that is distinct from the first bitrate. For example, the means for receiving the packet includes the receiver 654, the modem 656, the depacketizer 658, the input interface 1004, the processor(s) 1010, the antenna 1190, the transceiver 1150, the modem 1140, the processor(s) 1110, the processor 1106, one or more other circuits or components configured to receive the packet, or any combination thereof.

The apparatus also includes means for generating a reconstructed first data sample based on the first output data state. The reconstructed first data sample corresponds to a first data sample in a time series of data samples of a portion of an audio data stream. For example, the means for generating the reconstructed first data sample includes the bidirectional GRU layer 109, the backend neural network postprocessing layers 112, the decoder controller 665, the decoder network(s) 670, the decoder 672, the processor(s) 1010, the processor(s) 1110, the processor 1106, one or more other circuits or components configured to generate the reconstructed first data sample, or any combination thereof.

The apparatus further includes means for generating a reconstructed second data sample based on the second output data state. The reconstructed second data sample corresponds to a second data sample in the time series of data samples. For example, the means for generating the reconstructed second data sample includes the bidirectional GRU layer 109, the backend neural network postprocessing layers 112, the decoder controller 665, the decoder network(s) 670, the decoder 672, the processor(s) 1010, the processor(s) 1110, the processor 1106, one or more other circuits or components configured to generate the reconstructed second data sample, or any combination thereof.

In some implementations, a non-transitory computer-readable medium includes instructions that, when executed by one or more processors of a device, cause the one or more processors to generate an input data state (e.g., the input data states 122) for each data sample (e.g., the data samples 120) in a time series of data samples of a portion of an audio data stream (e.g., the data stream 604). Execution of the instructions also causes the one or more processors to provide at least one input data state to a first bottleneck (e.g., the bottleneck 108B) and at least one other input data state to a second bottleneck (e.g., the bottleneck 108A). The first bottleneck is associated with a first bitrate and the second bottleneck is associated with a second bitrate that is distinct from the first bitrate. Execution of the instructions further causes the one or more processors to generate a first encoded frame (e.g., the frame 420B) based on a first output data state (e.g., the output data state 124B) from the first bottleneck and a second encoded frame (e.g., the frame 420A) based on a second output data state (e.g., the output data state 124A) from the second bottleneck. The first encoded frame and the second encoded frame are bundled in a packet (e.g., the packet 430).

In some implementations, a non-transitory computer-readable medium includes instructions that, when executed by one or more processors of a device, cause the one or more processors to receive, at a decoder network, a packet (e.g., the packet 430) that includes a first encoded frame (e.g., the frame 420B) bundled with a second encoded frame (e.g., the frame 420A). The first encoded frame includes a first output data state (e.g., the output data state 124B) generated from a first bottleneck (e.g., the bottleneck 108B) of a feedback autoencoder, and the second encoded frame includes a second output data state (E.g., the output data state 124A) generated from a second bottleneck (e.g., the bottleneck 108A) of a feedback autoencoder. The first bottleneck is associated with a first bitrate, and the second bottleneck is associated with a second bitrate that is distinct from the first bitrate. Execution of the instructions also causes the one or more processors to generate a reconstructed first data sample (e.g., the reconstructed data sample 126B) based on the first output data state. The reconstructed first data sample corresponds to a first data sample (e.g., the data sample 120B) in a time series of data samples (e.g., the data samples 120) of a portion of an audio data stream (e.g., the data stream 604). Execution of the instructions further causes the one or more processors to generate a reconstructed second data sample (e.g., the reconstructed data sample 126A) based on the second output data state. The reconstructed second data sample corresponds to a second data sample (e.g., the data sample 120A) in the time series of data samples.

Particular aspects of the disclosure are described below in sets of interrelated examples:

According to Example 1, a device includes: a memory; and one or more processors coupled to the memory and operably configured to: generate a first input data state for data samples in a time series of data samples of a portion of an audio data stream; provide the first input data state to a first bottleneck and a second input data state, different from the first input data state, to a second bottleneck, the first bottleneck associated with a first bitrate and the second bottleneck associated with a second bitrate; and generate a first encoded frame based on a first output data state from the first bottleneck and a second encoded frame based on a second output data state from the second bottleneck, the first encoded frame and the second encoded frame bundled in a packet.

Example 2 includes the device of Example 1, wherein the first bottleneck and the second bottleneck are integrated into a bottleneck layer of a feedback autoencoder.

Example 3 includes the device of any of Examples 1 to 2, wherein the first and second input data states correspond to first and second encoder hidden states generated at a bidirectional gated recurrent unit (GRU) layer of the feedback autoencoder.

Example 4 includes the device of any of Examples 1 to 3, wherein the first bitrate is distinct from the second bitrate.

Example 5 includes the device of any of Examples 1 to 4, wherein the one or more processors are operably configured to allocate a smaller number of bits to latent codes generated at the first bottleneck than latent codes generated at the second bottleneck.

Example 6 includes the device of any of Examples 1 to 5, wherein a first codebook associated with the first bottleneck has a smaller size than a second codebook associated with the second bottleneck.

Example 7 includes the device of any of Examples 1 to 6, wherein the packet comprises a predicted frame and a reference frame, wherein an input data state associated with the predicted frame is provided to the first bottleneck, and wherein an input data state associated with the reference frame is provided to the second bottleneck.

Example 8 includes the device of any of Examples 1 to 7, wherein a bit size of the predicted frame is less than a bit size of the reference frame.

Example 9 includes the device of any of Examples 1 to 8, wherein the input data state for each frame of the packet is generated using an attention mechanism.

Example 10 includes the device of any of Examples 1 to 9, wherein the attention mechanism comprises a transformer.

Example 11 includes the device of any of Examples 1 to 10, wherein the one or more processors are operably configured to dynamically change the first bitrate and the second bitrate based on network conditions.

Example 12 includes a method comprising: generating a first input data state for data samples in a time series of data samples of a portion of an audio data stream; providing the first input data state to a first bottleneck and a second input data state, different from the first input data state, to a second bottleneck, the first bottleneck associated with a first bitrate and the second bottleneck associated with a second bitrate; and generating a first encoded frame based on a first output data state from the first bottleneck and a second encoded frame based on a second output data state from the second bottleneck, the first encoded frame and the second encoded frame bundled in a packet.

Example 13 includes the method of Example 12, wherein the first bottleneck and the second bottleneck are integrated into a bottleneck layer of a feedback autoencoder.

Example 14 includes the method of any of Examples 12 to 13, wherein the first and second input data states correspond to first and second encoder hidden states generated at a bidirectional gated recurrent unit (GRU) layer of the feedback autoencoder.

Example 15 includes the method of any of Examples 12 to 14, wherein the first bitrate is distinct from the second bitrate.

Example 16 includes the method of any of Examples 12 to 15, further comprising allocating a smaller number of bits to latent codes generated at the first bottleneck than latent codes generated at the second bottleneck.

Example 17 includes the method of any of Examples 12 to 16, wherein a first codebook associated with the first bottleneck has a smaller size than a second codebook associated with the second bottleneck.

Example 18 includes the method of any of Examples 12 to 17, wherein the packet comprises a predicted frame and a reference frame, wherein an input data state associated with the predicted frame is provided to the first bottleneck, and wherein an input data state associated with the reference frame is provided to the second bottleneck.

Example 19 includes the method of any of Examples 12 to 18, wherein a bit size of the predicted frame is less than a bit size of the reference frame.

Example 20 includes the method of any of Examples 12 to 19, wherein the input data state for each frame of the packet is generated using an attention mechanism.

Example 21 includes the method of any of Examples 12 to 20, wherein the attention mechanism comprises a transformer.

Example 22 includes the method of any of Examples 12 to 21, further comprising dynamically changing the first bitrate and the second bitrate based on network conditions.

Example 23 includes a non-transitory computer-readable medium storing steres instructions executable by one or more processors to: generate a first input data state for data samples in a time series of data samples of a portion of an audio data stream; provide the first input data state to a first bottleneck and a second input data state, different from the first input data state, to a second bottleneck, the first bottleneck associated with a first bitrate and the second bottleneck associated with a second bitrate; and generate a first encoded frame based on a first output data state from the first bottleneck and a second encoded frame based on a second output data state from the second bottleneck, the first encoded frame and the second encoded frame framed bundled in a packet.

Example 24 includes the non-transitory computer-readable medium of Example 23, wherein the first bottleneck and the second bottleneck are integrated into a bottleneck layer of a feedback autoencoder.

Example 25 includes the non-transitory computer-readable medium of any of Examples 23 to 24, wherein the first and second input data states correspond to first and second encoder hidden states generated at a bidirectional gated recurrent unit (GRU) layer of the feedback autoencoder.

Example 26 includes the non-transitory computer-readable medium of any of Examples 23 to 25, wherein the first bitrate is distinct from the second bitrate.

Example 27 includes the non-transitory computer-readable medium of any of Examples 23 to 26, wherein the instructions, when executed, further cause the one or more processors to allocate a smaller number of bits to latent codes generated at the first bottleneck than latent codes generated at the second bottleneck.

Example 28 includes the non-transitory computer-readable medium of any of Examples 23 to 27, wherein a first codebook associated with the first bottleneck has a smaller size than a second codebook associated with the second bottleneck.

Example 29 includes the non-transitory computer-readable medium of any of Examples 23 to 28, wherein the packet comprises a predicted frame and a reference frame, wherein an input data state associated with the predicted frame is provided to the first bottleneck, and wherein an input data state associated with the reference frame is provided to the second bottleneck.

Example 30 includes the non-transitory computer-readable medium of any of Examples 23 to 29, wherein a bit size of the predicted frame is less than a bit size of the reference frame.

Example 31 includes the non-transitory computer-readable medium of any of Examples 23 to 30, wherein the input data state for each frame of the packet is generated using an attention mechanism.

Example 32 includes the non-transitory computer-readable medium of any of Examples 23 to 31, wherein the attention mechanism comprises a transformer.

Example 33 includes the non-transitory computer-readable medium of any of Examples 23 to 32, wherein the instructions, when executed, further cause the one or more processors to dynamically change the first bitrate and the second bitrate based on network conditions.

Example 34 includes an apparatus comprising: means for generating a first input data state for data samples in a time series of data samples of a portion of an audio data stream; means for providing the first input data state to a first bottleneck and a second input data state, different from the first input data state, to a second bottleneck, the first bottleneck associated with a first bitrate and the second bottleneck associated with a second bitrate; and means for generating a first encoded frame based on a first output data state from the first bottleneck and a second encoded frame based on a second output data state from the second bottleneck, the first encoded frame and the second encoded frame bundled in a packet.

Example 35 includes the apparatus of Example 34, wherein the first bottleneck and the second bottleneck are integrated into a bottleneck layer of a feedback autoencoder.

Example 36 includes the apparatus of any of Examples 34 to 35, wherein the first and second input data states correspond to first and second encoder hidden states generated at a bidirectional gated recurrent unit (GRU) layer of the feedback autoencoder.

Example 37 includes the apparatus of any of Examples 34 to 36, wherein the first bitrate is distinct from the second bitrate.

Example 38 includes the apparatus of any of Examples 34 to 37, wherein a smaller number of bits is allocated to latent codes generated at the first bottleneck than latent codes generated at the second bottleneck.

Example 39 includes the apparatus of any of Examples 34 to 38, wherein a first codebook associated with the first bottleneck has a smaller size than a second codebook associated with the second bottleneck.

Example 40 includes the apparatus of any of Examples 34 to 39, wherein the packet comprises a predicted frame and a reference frame, wherein an input data state associated with the predicted frame is provided to the first bottleneck, and wherein an input data state associated with the reference frame is provided to the second bottleneck.

Example 41 includes the apparatus of any of Examples 34 to 40, wherein a bit size of the predicted frame is less than a bit size of the reference frame.

Example 42 includes the apparatus of any of Examples 34 to 41, wherein the input data state for each frame of the packet is generated using an attention mechanism.

Example 43 includes the apparatus of any of Examples 34 to 42, wherein the attention mechanism comprises a transformer.

Example 44 includes the apparatus of any of Examples 34 to 43, further comprising means for dynamically changing the first bitrate and the second bitrate based on network conditions.

Example 45 includes a device comprising: a memory; and one or more processors coupled to the memory and configured to execute instructions from the memory to: receive, at a decoder network, a packet that includes a first encoded frame bundled with a second encoded frame, the first encoded frame comprising a first output data state generated from a first bottleneck of a feedback autoencoder, the second encoded frame comprising a second output data state generated from a second bottleneck of the feedback autoencoder, wherein the first bottleneck is associated with a first bitrate and the second bottleneck is associated with a second bitrate; generate a reconstructed first data sample based on the first output data state, the reconstructed first data sample corresponding to a first data sample in a time series of data samples of a portion of an audio data stream; and generate a reconstructed second data sample based on the second output data state, the reconstructed second data sample corresponding to a second data sample in the time series of data samples.

Example 46 includes the device of Example 45, wherein the first output data state is distinct from the second output data state.

Example 47 includes the device of any of Examples 45 to 46, wherein the first output data state and the second output data state are received at a bidirectional gated recurrent unit (GRU) layer of the decoder network.

Example 48 includes the device of any of Examples 45 to 47, wherein the first bitrate is less than the second bitrate.

Example 49 includes the device of any of Examples 45 to 48, wherein the first output data state and the second output data state are received by an attention mechanism.

Example 50 includes the device of any of Examples 45 to 49, wherein the attention mechanism comprises a transformer.

Example 51 includes a method comprising: receiving, at a decoder network, a packet that includes a first encoded frame bundled with a second encoded frame, the first encoded frame comprising a first output data state generated from a first bottleneck of a feedback autoencoder, the second encoded frame comprising a second output data state generated from a second bottleneck of the feedback autoencoder, wherein the first bottleneck is associated with a first bitrate and the second bottleneck is associated with a second bitrate; generating a reconstructed first data sample based on the first output data state, the reconstructed first data sample corresponding to a first data sample in a time series of data samples of a portion of an audio data stream; and generating a reconstructed second data sample based on the second output data state, the reconstructed second data sample corresponding to a second data sample in the time series of data samples.

Example 52 includes the method of Example 51, wherein the first output data state is distinct from the second output data state.

Example 53 includes the method of any of Examples 51 to 52, wherein the first output data state and the second output data state are received at a bidirectional gated recurrent unit (GRU) layer of the decoder network.

Example 54 includes the method of any of Examples 51 to 53, wherein the first bitrate is less than the second bitrate.

Example 55 includes the method of any of Examples 51 to 54, wherein the first output data state and the second output data state are received by an attention mechanism.

Example 56 includes the method of any of Examples 51 to 55, wherein the attention mechanism comprises a transformer.

Example 57 includes a non-transitory computer-readable medium storing instructions executable by one or more processors to: receive, at a decoder network, a packet that includes a first encoded frame bundled with a second encoded frame, the first encoded frame comprising a first output data state generated from a first bottleneck of a feedback autoencoder, the second encoded frame comprising a second output data state generated from a second bottleneck of the feedback autoencoder, wherein the first bottleneck is associated with a first bitrate and the second bottleneck is associated with a second bitrate; generate a reconstructed first data sample based on the first output data state, the reconstructed first data sample corresponding to a first data sample in a time series of data samples of a portion of an audio data stream; and generate a reconstructed second data sample based on the second output data state, the reconstructed second data sample corresponding to a second data sample in the time series of data samples.

Example 58 includes the non-transitory computer-readable medium of Example 57, wherein the first output data state is distinct from the second output data state.

Example 59 includes the non-transitory computer-readable medium of Example 57 or Example 58, wherein the first output data state and the second output data state are received at a bidirectional gated recurrent unit (GRU) layer of the decoder network.

Example 60 includes the non-transitory computer-readable medium of any of Examples 57 to 59, wherein the first bitrate is less than the second bitrate.

Example 61 includes the non-transitory computer-readable medium of any of Examples 57 to 60, wherein the first output data state and the second output data state are received by an attention mechanism.

Example 62 includes the non-transitory computer-readable medium of any of Examples 57 to 61, wherein the attention mechanism comprises a transformer.

Example 63 includes an apparatus comprising: means for receiving, at a decoder network, a packet that includes a first encoded frame bundled with a second encoded frame, the first encoded frame comprising a first output data state generated from a first bottleneck of a feedback autoencoder, the second encoded frame comprising a second output data state generated from a second bottleneck of the feedback autoencoder, wherein the first bottleneck is associated with a first bitrate and the second bottleneck is associated with a second bitrate; means for generating a reconstructed first data sample based on the first output data state, the reconstructed first data sample corresponding to a first data sample in a time series of data samples of a portion of an audio data stream; and means for generating a reconstructed second data sample based on the second output data state, the reconstructed second data sample corresponding to a second data sample in the time series of data samples.

Example 64 includes the apparatus of Example 63, wherein the first output data state is distinct from the second output data state.

Example 65 includes the apparatus of any of Examples 63 to 64, wherein the first output data state and the second output data state are received at a bidirectional gated recurrent unit (GRU) layer of the decoder network.

Example 66 includes the apparatus of any of Examples 63 to 65, wherein the first bitrate is less than the second bitrate.

Example 67 includes the apparatus of any of Examples 63 to 66, wherein the first output data state and the second output data state are received by an attention mechanism.

Example 68 includes the apparatus of any of Examples 63 to 67, wherein the attention mechanism comprises a transformer.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein and is to be accorded the widest scope possible consistent with the principles and novel features as defined by the following claims.

What is claimed is:

1. A device comprising:

a memory; and one or more processors coupled to the memory and operably configured to:

generate a first input data state for data samples in a time series of data samples of a portion of an audio data stream;

provide the first input data state to a first bottleneck and a second input data state, different from the first input data state, to a second bottleneck, the first bottleneck associated with a first bitrate and the second bottleneck associated with a second bitrate; and generate a first encoded frame based on a first output data state from the first bottleneck and a second encoded frame based on a second output data state from the second bottleneck, the first encoded frame and the second encoded frame bundled in a packet.

2. The device of claim 1, wherein the first bottleneck and the second bottleneck are integrated into a bottleneck layer of a feedback autoencoder.

3. The device of claim 2, wherein the first and second input data states corresponds to first and second encoder hidden states generated at a bidirectional gated recurrent unit (GRU) layer of the feedback autoencoder.

4. The device of claim 1, wherein the first bitrate is distinct from the second bitrate.

5. The device of claim 4, wherein the one or more processors are operably configured to allocate a smaller number of bits to latent codes generated at the first bottleneck than latent codes generated at the second bottleneck.

6. The device of claim 4, wherein a first codebook associated with the first bottleneck has a smaller size than a second codebook associated with the second bottleneck.

7. The device of claim 4, wherein the first encoded frame corresponds to a predicted frame and the second encoded frame corresponds to a reference frame.

8. The device of claim 7, wherein a bit size of the predicted frame is less than a bit size of the reference frame.

9. The device of claim 1, wherein the first input data state and the second input data state are generated using an attention mechanism.

10. The device of claim 9, wherein the attention mechanism comprises a transformer.

11. The device of claim 1, wherein the one or more processors are operably configured to dynamically change the first bitrate and the second bitrate based on network conditions.

12. A method comprising:

generating a first input data state for data samples in a time series of data samples of a portion of an audio data stream;

providing the first input data state to a first bottleneck and a second input data state, different from the first input data state, to a second bottleneck, the first bottleneck associated with a first bitrate and the second bottleneck associated with a second bitrate; and generating a first encoded frame based on a first output data state from the first bottleneck and a second encoded frame based on a second output data state from the second bottleneck, the first encoded frame and the second encoded frame bundled in a packet.

13. The method of claim 12, wherein the first bottleneck and the second bottleneck are integrated into a bottleneck layer of a feedback autoencoder.

14. The method of claim 13, wherein the first and second input data states correspond to first and second encoder hidden states generated at a bidirectional gated recurrent unit (GRU) layer of the feedback autoencoder.

15. The method of claim 12, wherein the first bitrate is distinct from the second bitrate.

16. The method of claim 15, further comprising allocating a smaller number of bits to latent codes generated at the first bottleneck than latent codes generated at the second bottleneck.

17. The method of claim 15, wherein a first codebook associated with the first bottleneck has a smaller size than a second codebook associated with the second bottleneck.

18. The method of claim 15, wherein the first encoded frame corresponds to a predicted frame and the second encoded frame corresponds to a reference frame.

19. The method of claim 12, wherein the first input data state and the second input data state are generated using an attention mechanism.

20. The method of claim 12, further comprising dynamically changing the first bitrate and the second bitrate based on network conditions.

21. A device comprising:

a memory; and one or more processors coupled to the memory and operably configured to:

receive, at a decoder network, a packet that includes a first encoded frame bundled with a second encoded frame, the first encoded frame comprising a first output data state generated from a first bottleneck of a feedback autoencoder, the second encoded frame comprising a second output data state generated from a second bottleneck of the feedback autoencoder, wherein the first bottleneck is associated with a first bitrate and the second bottleneck is associated with a second bitrate;

generate a reconstructed first data sample based on the first output data state, the reconstructed first data sample corresponding to a first data sample in a time series of data samples of a portion of an audio data stream; and generate a reconstructed second data sample based on the second output data state, the reconstructed second data sample corresponding to a second data sample in the time series of data samples.

22. The device of claim 21, wherein the first output data state is distinct from the second output data state.

23. The device of claim 21, wherein the first output data state and the second output data state are received at a bidirectional gated recurrent unit (GRU) layer of the decoder network.

24. The device of claim 21, wherein the first bitrate is distinct from the second bitrate.

25. The device of claim 21, wherein the first output data state and the second output data state are received by an attention mechanism.

26. The device of claim 25, wherein the attention mechanism comprises a transformer.

27. A method comprising:

receiving, at a decoder network, a packet that includes a first encoded frame bundled with a second encoded frame, the first encoded frame comprising a first output data state generated from a first bottleneck of a feedback autoencoder, the second encoded frame comprising a second output data state generated from a second bottleneck of the feedback autoencoder, wherein the first bottleneck is associated with a first bitrate and the second bottleneck is associated with a second bitrate;

generating a reconstructed first data sample based on the first output data state, the reconstructed first data sample corresponding to a first data sample in a time series of data samples of a portion of an audio data stream; and generating a reconstructed second data sample based on the second output data state, the reconstructed second data sample corresponding to a second data sample in the time series of data samples.

28. The method of claim 27, wherein the first output data state is distinct from the second output data state.

29. The method of claim 27, wherein the first output data state and the second output data state are received at a bidirectional gated recurrent unit (GRU) layer of the decoder network.

30. The method of claim 27, wherein the first bitrate is less than the second bitrate.

* * * * *